United States Patent
Taguchi et al.

(10) Patent No.: US 8,483,949 B2
(45) Date of Patent: Jul. 9, 2013

(54) RUNNING PATTERN CALCULATING APPARATUS AND RUNNING PATTERN CALCULATING METHOD

(75) Inventors: Koji Taguchi, Isehara (JP); Masaki Matsunaga, Kanagawa-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 474 days.

(21) Appl. No.: 12/758,261

(22) Filed: Apr. 12, 2010

(65) Prior Publication Data

US 2010/0262408 A1     Oct. 14, 2010

(30) Foreign Application Priority Data

Apr. 13, 2009   (JP) .................................. 2009-097313
Feb. 24, 2010   (JP) .................................. 2010-039340

(51) Int. Cl.
*G01C 21/20* (2006.01)

(52) U.S. Cl.
USPC ................. 701/411; 701/23; 701/25; 701/80; 340/438

(58) Field of Classification Search
USPC .................. 701/23, 25, 26, 301, 411, 72, 74, 701/79, 80; 340/435, 436, 438
See application file for complete search history.

(56) References Cited

U.S. PATENT DOCUMENTS 6,032,098 A * 2/2000 Takahashi et al. .............. 701/23

FOREIGN PATENT DOCUMENTS

| JP | 10-246325 | 9/1998 |
| JP | 2002-251597 | 9/2002 |
| JP | 2002-370560 | 12/2002 |
| JP | 2005-91112 | 4/2005 |
| JP | 2006-163940 | 6/2006 |
| JP | 2006-327545 | 12/2006 |
| JP | 2007-187090 | 7/2007 |
| JP | 2007-291919 | 11/2007 |
| JP | 2009-149286 | 7/2009 |
| JP | 2010-41767 | 2/2010 |
| JP | 2010-264820 | 11/2010 |
| JP | 2010-285139 | 12/2010 |

* cited by examiner

Primary Examiner — Gertrude Arthur Jeanglaude
(74) Attorney, Agent, or Firm — Oblon, Spivak, McClelland, Maier & Neustadt, L.L.P.

(57) ABSTRACT

A running pattern calculating apparatus and running pattern calculating method that stores road information; predicts a running state when the vehicle will travel on a road, based on the stored road information; divides the road into a plurality of sections based on the predicted running state and sets an evaluation function for each road section; and calculates a running pattern of the vehicle that will travel on the road, based on the evaluation function set for each road section.

12 Claims, 10 Drawing Sheets

| SECTION | ASSIST CONTROL |
|---|---|
| ACCELERATION SECTION | • NEEDLESS ACCELERATION RESTRICTION (SUPPRESSION)<br>• ACCELERATION ASSIST |
| COASTING SECTION | • ACCELERATION RESTRICTION (SUPPRESSION)<br>• COASTING ASSIST (EQUIVALENT TO N-RANGE IN A MT; 0 COMMAND TORQUE IN A HV) |

RUNNING PATTERN CALCULATING APPARATUS AND RUNNING PATTERN CALCULATING METHOD

INCORPORATION BY REFERENCE

The disclosure of Japanese Patent Applications No. 2009-097313 filed on Apr. 13, 2009 and No. 2010-039340 filed on Feb. 24, 2010 including the specifications, drawings and abstracts is incorporated herein by reference in its entirety.

BACKGROUND OF THE INVENTION

1. Field of the Invention

The invention relates to a running pattern calculating apparatus and a running pattern calculating method.

2. Description of the Related Art

The increase in the price of crude oil last year and the need for technology to improve the environment by reducing $CO_2$ and the like have made improving fuel efficiency a top priority. In the past, coasting has been empirically known as an ideal way to improve fuel efficiency in eco-run competitions to see how many kilometers a vehicle can travel on a circuit or the like on only one liter of gasoline, for example. Also, in a vehicle in which the engine can be stopped while the vehicle is traveling, such as with a hybrid system (HV), stopping the engine while the vehicle is traveling is known as an effective way to improve fuel efficiency when the vehicle is traveling.

The ultimate improvement in the fuel efficiency of vehicles is to run vehicles according to optimal running patterns rather than according to the intentions of the users (i.e., the drivers). Test results and the like have shown that doing so yields improvements in fuel efficiency of more than 30%. In recent years, optimization methods for optimizing the running pattern and the speed ratio have been developed using an evaluation function such as fuel efficiency in order to provide running assist and automatic running control in vehicles (see Japanese Patent Application Publication No. 2002-251597 (JP-A-2002-251597) and Japanese Patent Application Publication No. 10-246325 (JP-A-10-246325). These optimization methods here generally presume that running patterns that have been newly generated from previous generated running patterns are closer and closer to the ideal solution. That is, the optimization technology is technology that assumes that there must be a pattern C that is ultimately better than an operating pattern B that is in turn relatively better than a given operating pattern A, and therefore arrives at the pattern C, which is the optimum solution, by repeating the process of transforming the given operating pattern A to the operating pattern B, based on that assumption. The optimization method assumes that the best pattern is an extension of a pattern that is better than the current pattern, and there are no worse patterns in between.

However, when attempting to apply the optimization method to fuel efficiency evaluation, the engine has a discontinuous characteristic in which the efficiency is worst at low engine speeds (such as approximately 800 rpm (idle speed) to 1500 rpm) and good at an engine speed of zero as well as at medium and high engine speeds. Therefore, even if the evaluation function process is repeated in an attempt at total optimization, a running pattern having a running state that stops the engine (i.e., zero rpm) is unable to be obtained, and as a result, an operating pattern obtained by the optimization method performed to improve fuel efficiency does not necessarily end up to be a fuel efficient operating pattern. That is, when the related optimization method is applied as it is, the engine efficiency conversely decreases in a region (near a low engine speed) where the engine speed decreases toward zero (at which the engine is stopped) from an engine speed where the engine efficiency is good (i.e., a medium or high engine speed), so the fuel efficiency becomes worse and an operating pattern that includes low vehicle speeds ends up being rejected. As a result, the engine efficiency falls to the local minimum and a running pattern that is ideal for fuel efficiency, the vehicle alternately accelerates and coasts repeatedly etc., is not able to be reached.

Therefore, the local minimum problem caused by discontinuity in the thermal efficiency between when the engine is operating and when the engine is stopped is avoided, and the running pattern related to fuel efficiency or the like is optimized, by fixing an operating pattern that includes accelerating and coasting, and giving up on total optimization as a restraint condition. Here, the method described in Japanese Patent Application Publication No. 2006-327545 (JP-A-2006-327545) is a method for improving the movement results with respect to fuel efficiency or the like by setting a restraint condition to restrain movement when a moving object is traveling in a section from a point of departure to a point of arrival. For example, a fuel efficient operating pattern is generated by establishing a restraining condition by setting a fixed operating pattern in a range in which a process of acceleration steady travel deceleration, for example, occurs once.

Also, Japanese Patent Application Publication No. 2007-187090 (JP-A-2007-187090) and Japanese Patent Application Publication No. 2007-291919 (JP-A-2007-291919) describe methods that improve fuel efficiency characteristics by storing maps related to speed and vehicle-to-vehicle distance in advance and determining whether the vehicle is coasting or the like by checking against the stored map, instead of by evaluating the fuel efficiency or the like according to an evaluation function.

However, in the related optimization method, although localized optimization is performed with respect to fuel efficiency or the like, total optimization will not necessarily be achieved.

In particular, with the method described in JP-A-2006-327545, when a general travel plan in which accelerating and coasting are repeated is estimated, it provides fuel efficient running in parts so there are localized improvements in fuel efficiency. However, a repetitive pattern that is based on a calculation that will further improve the overall fuel efficiency from departure to arrival while the vehicle is actually traveling is not generated. That is, in the actual running environment, it is necessary to obtain a continuous solution, such as that shown in FIG. 17 of JP-A-2006-327545. However, the method described in JP-A-2006-327545 simply appropriates the results of a fixed pattern and does not include adjustments of the specific acceleration and the like in parts. Therefore, separate changes must be made to obtain total optimization.

Also, with the methods described in JP-A-2007-187090 and JP-A-2007-291919, although localized improvements in fuel efficiency are realized using the maps related to speed and vehicle-to-vehicle distance, these publications do not consider total optimization.

Also, with respect to required acceleration following an actual driving operation by the driver, JP-A-2006-327545 does not consider how to coordinate driver operations with vehicle control based on a target operating pattern in order to bring the actual operating pattern closer to the target operating pattern. Accordingly, there is room for improvement to more efficiently coordinate driver operations with vehicle control based on a travel plan.

SUMMARY OF THE INVENTION

This invention thus provides a running pattern calculating apparatus and a running pattern calculating method able to improve total optimization regarding fuel efficiency or the like by avoiding a local minimum problem due to a discontinuity in engine characteristics, without fixing an operating pattern.

Also, the invention is able to more efficiently coordinate driver operations with vehicle control based on a travel plan. As a result, the travel plan is able to be achieved to an even greater level.

A first aspect of the invention relates to a running pattern calculating apparatus that calculates a running pattern in a path along which a vehicle will travel. This running pattern calculating apparatus includes a road information storage portion that stores road information; a running state predicting portion that predicts a running state when the vehicle will travel on a road, based on the road information stored in the road information storage portion; an evaluation function setting portion that divides the road into a plurality of sections based on the running state predicted by the running state predicting portion, and sets an evaluation function for each road section; and a running pattern calculating portion that calculates a running pattern of the vehicle that will travel on the road, based on the evaluation function set for each road section by the evaluation function setting portion.

In the structure, the running pattern calculating portion may calculate the running pattern with the position of the division between the sections of the road divided by the evaluation function setting portion as a variable condition.

In the structure described above, the running state predicting portion may calculate a speed pattern predicted when the vehicle will travel on the road, based on the road information stored in the road information storage portion, and the evaluation function setting portion may divide the road into at least an acceleration section and a deceleration section as the road sections, based on the speed pattern calculated by the running state predicting portion, and set an acceleration section evaluation function for the acceleration section, and a deceleration section evaluation function for the deceleration section.

In the foregoing structure, the evaluation function setting portion may set the evaluation function that evaluates an engine speed of equal to or higher than medium speed as more preferable than an engine speed near zero, as the acceleration section evaluation function.

In the foregoing structure, the evaluation function setting portion may obtain a rate of thermal efficiency of an engine at each point when the best point for the thermal efficiency is given a numerical value of 1, set the evaluation function in which the difference between each of all of the obtained thermal efficiency rates and 1 becomes an evaluation value as the acceleration section evaluation function, and make the evaluation value when the engine speed is near zero a numerical value greater than 0.

In the foregoing structure, the evaluation function setting portion may set the evaluation function that evaluates an engine speed near zero as more preferable than an engine speed equal to or higher than medium speed as the deceleration section evaluation function.

In the foregoing structure, the evaluation function setting portion may set the evaluation function in which a numerical value at which the loss of energy input/output in a hybrid system is proportionate to acceleration/deceleration energy removed from rolling resistance deceleration is the evaluation value, when the rolling resistance is 0 as a reference, as the deceleration section evaluation function, and make the evaluation value when the engine speed is equal to or higher than medium engine speed a numerical value greater than 0.

In the structure described above, the running state predicting portion may calculate a friction circle use rate predicted when the vehicle will travel on the road, based on the road information stored in the road information storage portion, and the evaluation function setting portion may set the evaluation function for the road section in which the friction circle use rate calculated by the running state predicting portion is relatively high different from the evaluation function for the road section in which the friction circle use rate is relatively low.

In the structure described above, when the friction circle use rate calculated by the running state predicting portion is relatively high, the evaluation function setting portion may set the evaluation function that evaluates acceleration emphasizing thermal efficiency based on the engine operating state together with a hybrid system as preferable for the road section in which the running state is an accelerating state, and set the evaluation function that evaluates deceleration by regeneration and power assist based on the engine being off as preferable for the road section in which the running state is a decelerating state.

Also, a second aspect of the invention relates to a running pattern calculating method for calculating a running pattern in a path along which a vehicle will travel. This running pattern calculating method includes storing road information; predicting a running state when the vehicle will travel on a road, based on the stored road information; dividing the road into a plurality of sections based on the predicted running state, and setting an evaluation function for each road section; and calculating a running pattern of the vehicle that will travel on the road, based on the evaluation function set for each road section.

According to the first and second aspects, the local minimum problem due to the discontinuity of the engine characteristics can be avoided without fixing the operating pattern, so total optimization with respect to fuel efficiency or the like can be improved.

In the structure described above, the running pattern calculating apparatus may also include an assist control unit that defines a plurality of sections corresponding to the running state based on a target speed/acceleration pattern related to a target speed or a target acceleration when the vehicle is traveling, and assists to achieve a travel plan for each defined section.

This assist control apparatus executes control that defines a plurality of sections corresponding to the running state with respect to the target speed/acceleration pattern, and assists in achieving the travel plan for each defined section. Accordingly, operations by the driver and vehicle control based on a travel plan can be more effectively coordinated. As a result, the travel plan is able to be achieved to an even greater level.

In this structure, the assist control unit may output, in a visually and/or audibly recognizable manner, information related to the running state corresponding to the section and/or information related to a difference between the speed or the acceleration of the target speed/acceleration pattern and the speed or the acceleration input to the vehicle by the driver.

Accordingly, compatibility between vehicle control based on the travel plan and operations by the driver can be improved. As a result, the travel plan is able to be achieved to an even greater level. In other words, the assist control apparatus performs active assist control, and actively provides information related to the running state or information related to the difference to the driver. Accordingly, compatibility between vehicle control and operations by the driver can be improved by the mutual interaction of these. As a result, the travel plan can be realized with even greater performance. Also, the assist control apparatus outputs information related to the running state and/or information related to the difference between the target pattern and the driver input, so even if the vehicle is actively assist-controlled, feelings of unpleasantness or abruptness that the driver may have with respect to the assist control can be effectively suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 7 is a diagram showing the structure of an ECU and the like;

DETAILED DESCRIPTION OF EMBODIMENTS

Example embodiments of the running pattern calculating apparatus and the running pattern calculating method, together with a program, of the present invention will be described in greater detail below with reference to the accompanying drawings. Incidentally, the invention is not limited to these example embodiments.

1. Structure

Figure 1:
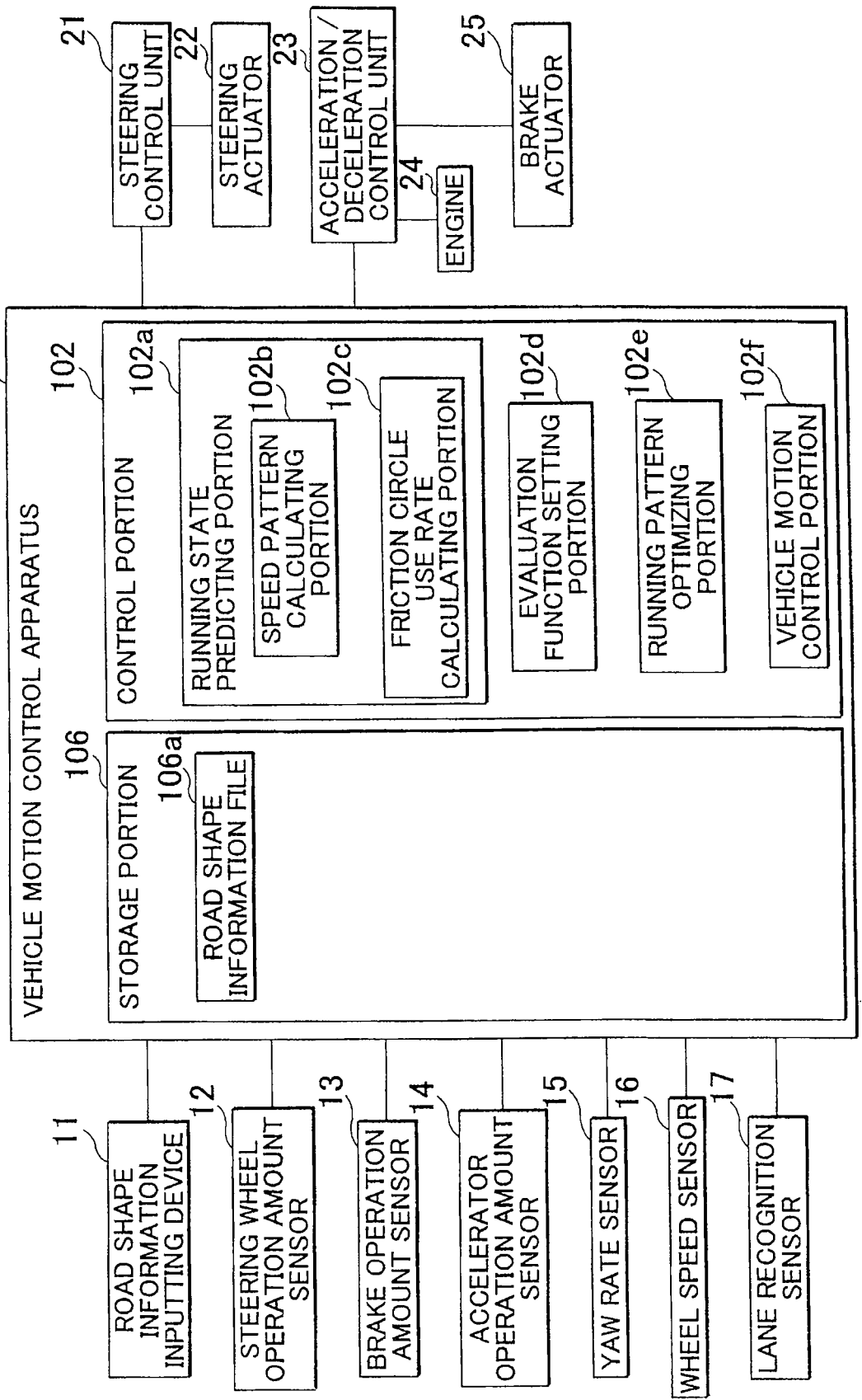
FIG. 1 is a block diagram of one example of a structure of the system provided with a vehicle motion control apparatus to which the invention may be applied.

First, the structures of the running pattern calculating apparatus, the vehicle motion control apparatus for executing a program and the running pattern calculating method, and the system that includes these apparatuses will be described with reference to FIG. 1. FIG. 1 is a block diagram of one example of the structure of the system provided with a vehicle motion control apparatus to which the invention may be applied. FIG. 1 schematically shows only those constituent portions that are related to the invention. This system is generally formed by a vehicle motion control apparatus 100, devices (i.e., a road shape information inputting device 11, a steering wheel operation amount sensor 12, a brake operation amount sensor 13, an accelerator operation amount sensor 14, a yaw rate sensor 15, a wheel speed sensor 16, and a lane recognition sensor 17) for inputting various state quantities related to the vehicle and the road and the like, and devices (i.e., a steering control unit 21, a steering actuator 22, an acceleration/deceleration control unit 23, and engine 24, and a brake actuator 25) that receive the vehicle motion control values, all of which are connected together by suitable communication paths so that communication among them is possible.

In FIG. 1, the road shape information inputting device 11 is a device of a navigation system or the like for inputting information such as the shape of the road on which the vehicle will travel to the vehicle motion control apparatus 100. This road shape information inputting device 11 inputs road shape information relating to the road shape (i.e., road width, gradient, etc.) to the vehicle motion control apparatus 100. For example, the road shape information inputting device 11 includes a GPS antenna and a processing unit and the like, and is a sensor or the like that estimates the position and the like of the host vehicle. The road shape information inputting device 11 receives a GPS signal from GPS satellites via the GPS antenna, demodulates that GPS signal with the processing unit, and calculates the position and the like of the host vehicle based on the demodulated positioning data from the GPS satellites. Then the road shape information inputting device 11 reads the road shape information of the road that the host vehicle is currently traveling on from a map database or the like using a navigation system that detects the current position of the host vehicle and performs route guidance to a destination, and outputs that road shape information as a navigation signal to the vehicle motion control apparatus 100. Incidentally, with a vehicle that is not provided with a navigation system, at the very least, road information from a map database or the like may be stored and this road shape information may be read from the position of the host vehicle. Also, the road shape information may also be obtained using road-to-vehicle communication or the like.

Also, the steering wheel operation amount sensor 12 is a sensor that detects the operation amount of a steering wheel, the brake operation amount sensor 13 is a sensor that detects the operation amount of a brake pedal, and the accelerator operation amount sensor 14 is a sensor that detects the operation amount of an accelerator pedal. The steering wheel operation amount sensor 12, the brake operation amount sensor 13, and the accelerator operation amount sensor 14 detect the respective operation amounts and output them to the vehicle motion control apparatus 100.

Also, the yaw rate sensor 15 is a sensor that detects the yaw rate generated in the host vehicle. This yaw rate sensor 15 detects the yaw rate and outputs it as a yaw rate signal to the vehicle motion control apparatus 100.

Further, the wheel speed sensor 16 is provided on each of the four wheels of the vehicle. The wheel speed sensor 16 detects the rotation speed of the corresponding wheel (i.e., the number of pulses corresponding to the rotation of the wheel). The wheel speed sensor 16 detects the number of rotation pulses of the wheel at predetermined intervals of time and outputs that number as a wheel speed signal to the vehicle motion control apparatus 100. The vehicle motion control apparatus 100 calculates the wheel speed of each wheel from the rotation speed of each wheel, and then calculates the vehicle body speed (i.e., the vehicle speed) from the wheel speed of each wheel.

Also, the lane recognition sensor 17 includes a camera and an image processing device, and is a sensor that detects a pair of white lines (a lane). The lane recognition sensor 17 captures an image of the road in front of the host vehicle with the camera and then recognizes the pair of white lines indicating the lane in which the vehicle is traveling from the captured image using the image processing device. The lane recognition sensor 17 then calculates the lane width from the recognized pair of white lines, a line passing through the center between the pair of white lines (i.e., a lane center line), the radius at the center of the lane (i.e., curve radius R), the curve curvature $\gamma$ (=1/R) from the curve radius R, the direction in which the vehicle is headed with respect to the lane (i.e., the yaw angle), and the position of the center of the vehicle with respect to the center of the lane (i.e., offset), and the like. Then the lane recognition sensor 17 outputs the information of the recognized pair of white lines and the various calculated information as a white line detection signal to the vehicle motion control apparatus 100.

In FIG. 1, the vehicle motion control apparatus 100 is an apparatus such as an engine control unit (ECU) formed generally by a control portion 102, a storage portion 106, and an interface, not shown, and the like. Here, the control portion 102 is a CPU or the like that comprehensively controls the entire vehicle motion control apparatus 100. Also, the storage portion 106 is a device made up of read-only memory (ROM) and random access memory (RAM) or the like that stores various databases and tables and the like. These various parts of the vehicle motion control apparatus 100 are all connected together via a suitable communication paths so that communication among them is possible.

The various databases and tables (i.e., road shape information file 106a) stored in the storage portion 106 are storing means of a fixed disk drive or the like. For example, the storage portion 106 stores various programs, tables, files, and databases and the like used in various processing.

Of these various constituent elements of the storage portion 106, the road shape information file 106a is road information storing means for storing road information such as the road shape information. Here, the road shape information is information that defines the shape of the road on which the will travel. For example, the road shape information file 106a stores the shape and the like of the road along a route from the position of the host vehicle to a destination received from the road shape information inputting apparatus 11. Here, this road information may include information based on the white line detection signal received from the lane recognition sensor 17 (i.e., information such as the lane width, the center line, the curve radius R, and the curve curvature $\gamma$ and the like).

Also, in FIG. 1, the control portion 102 has internal memory for storing a control program such as an operating system (OS), programs specifying various processing routines and the like, as well as necessary data. The control portion 102 processes information to execute various routines according to these programs and the like. In general, the control portion 102 functionally includes a running state predicting portion 102a, an evaluation function setting portion 102d, a running pattern optimizing portion 102e, and a vehicle motion control portion 102f.

Of these, the running state predicting portion 102a is running state predicting means for predicting the running state (a state quantity) when the vehicle will travel on a road, based on road information such as the road shape information stored in the road shape information file 106a. Examples of a state quantity indicative of the running state of the vehicle include speed (i.e., vehicle speed), acceleration, engine speed, torque, horsepower, and friction circle use rate and the like. Here, the running state predicting portion 102a includes an operating pattern calculating portion 102b and a friction circle use rate calculating portion 102c, as shown in FIG. 1. The operating pattern calculating portion 102b is operating pattern calculating means for calculating an operating pattern predicted when the vehicle will travel on the road, based on the road shape information stored in the road shape information file 106a. Here, the operating pattern is not limited to a pattern of the speed of the vehicle (i.e., the vehicle speed), but may be a pattern of acceleration, e.g., acceleration or deceleration, or a pattern of the value of, or increase and decrease in, engine speed, torque, horsepower, or driving force or the like. Also, the friction circle use rate calculating portion 102c is friction circle use rate calculating means for calculating the friction circle use rate predicted when the vehicle will travel on a road, based on the road shape information stored in the road shape information file 106a.

Also, the evaluation function setting portion 102d is evaluation function setting means for dividing the road into a plurality of sections and setting an evaluation function for each section of road based on the running state (i.e., the state quantity) predicted by the running state predicting portion 102a.

Here, the evaluation function setting portion 102d may divide the road into at least an acceleration section and a deceleration section, as the sections of road, based on the operating pattern calculated by the operating pattern calculating portion 102b of the running state predicting portion 102a, and set an evaluation function for the acceleration section (i.e., an acceleration section evaluation function), and an evaluation function for the deceleration section (i.e., a deceleration section evaluation function). For example, when the operating pattern is defined by the vehicle speed, the evaluation function setting portion 102d may set the section where the vehicle accelerates as the acceleration section and set the section where the vehicle decelerates as the deceleration section, for example. Also, when the operating pattern is defined by acceleration, the evaluation function setting portion 102d may set the section where the acceleration is greater than 0 as the acceleration section and set the section where the acceleration is equal to or less than 0 as the deceleration section, for example. Also, when the operating pattern is defined by the engine speed, the evaluation function setting portion 102d may set the section where the engine speed is greater than a threshold value (such as an engine speed of zero or a low engine speed) as the acceleration section, and set the section where the engine speed is equal to or less than the threshold value as the deceleration section, for example. In addition, when the operating pattern is defined by torque, horsepower, or driving force or the like, the evaluation function setting portion 102d sets the acceleration section and the deceleration section based on a corresponding threshold value set in advance. Incidentally, the deceleration section may also include a coasting section and a constant speed section (i.e., a steady travel section) and the like, or conversely, the acceleration section may include a steady travel section and the like. Also, the invention is not limited to this. For example, a coasting section and a steady travel section and the like may be set separately from the acceleration section and the deceleration section.

Here, the acceleration section evaluation function is an evaluation function for evaluating an engine operating state with good thermal efficiency as preferable, for example. For example, the acceleration section evaluation function is an evaluation function for evaluating an engine speed equal to or higher than medium engine speed as more preferable than an engine speed near zero. More specifically, the acceleration section evaluation function is an evaluation function that obtains the ratio of thermal efficiency at each point when the best point for thermal efficiency of the engine is given a numerical value of 1, and the difference between each of all of the obtained thermal efficiency rates and 1 is taken as the evaluation value. The evaluation value is a numerical value greater than 0 when the engine speed is near zero. Also, the deceleration section evaluation function is an evaluation function for evaluating an engine-off state as preferable, for example. For example, the deceleration section evaluation function is an evaluation function that evaluates an engine speed near zero as more preferable than a medium engine speed. More specifically, the deceleration section evaluation function is an evaluation function in which a numerical value at which the loss of the energy input and output in the hybrid system is proportionate to the acceleration/deceleration energy removed from the rolling resistance deceleration is the evaluation value, when the rolling resistance is 0 as a reference, and the evaluation value is a numerical value greater than 0 when the engine speed is equal to or higher than medium engine speed.

Also, the evaluation function setting portion 102d may also set an evaluation function that emphasizes thermal efficiency based on the engine speed together with the hybrid system, for the section of road where the running state is an acceleration state, when the friction circle use rate is relatively high, based on the friction circle use rate calculated by the friction circle use rate calculating portion 102c of the running state predicting portion 102a.

Also, the running pattern optimizing portion 102e is running pattern calculating means for calculating a running pattern of the vehicle that will travel on a road, based on the evaluation function set for each section of road by the evaluation function setting portion 102d. Incidentally, this running pattern may include information about the operating pattern in addition to information regarding the coordinates (i.e., location) where the vehicle will travel. Here, the running pattern optimizing portion 102e may also change position of the dividing location between sections of road divided by the evaluation function setting portion 102d in the optimization processing, as a variable condition. For example, when the operating pattern of the generated running pattern changes from the operating pattern calculated by the operating pattern calculating portion 102b, such that the engine speed is over or under threshold value for setting the road section by the evaluation function setting portion 102d while repetition processing in the optimization processing is being performed, the running pattern optimizing portion 102e may change the length of a road section accordingly. That is, the running pattern optimizing portion 102e may reset the road section corresponding to the respective evaluation function, according to the changed operating pattern and the like. Also, as another example in which the position of the dividing location is a variable condition, the operating pattern can also be changed according to priorities that can be read from a driving operation by the driver (i.e., whether to priority is placed on fuel efficiency or on reaching the destination quickly (i.e., early arrival time)). That is, the operating pattern may be changed by a driving operation by the driver, and the evaluation function and the road section may be reset accordingly.

Further, the vehicle motion control portion 102f is vehicle motion controlling means for outputting a vehicle motion control value to the steering control unit 21 and the acceleration/deceleration control unit 23 and the like, based on the running pattern calculated by the running pattern optimizing portion 102e.

As shown in FIG. 1, the steering control unit 21 is a control device that outputs a steering control signal to the steering actuator 22 based on the vehicle motion control value received from the vehicle motion control apparatus 100.

Also, the steering actuator 22 is an actuator for applying steering torque to a steering mechanism (such as a rack, pinion, and column, etc.) by transmitting rotational driving force from a motor to the steering mechanism via a reduction mechanism, for example. Upon receiving a steering control signal from the steering control unit 21, this steering actuator 22 drives the motor according to the steering control signal to generate steering torque.

Also, the acceleration/deceleration control unit 23 is a control unit that outputs an engine control signal to the engine 24 and a brake control signal to the brake actuator 25, for example, based on the vehicle motion control value received from the vehicle motion control apparatus 100.

Further, the engine 24 is one driving source that is designed such that the throttle valve opening amount can be adjusted and the engine can be controlled on and off. In this engine 24, when an engine control signal, is received from the acceleration/deceleration control unit 23, the actuator operates in response to that engine control signal, such that the throttle valve opening amount is adjusted and the engine is controlled on or off. Incidentally, when this system is applied to a hybrid system, some of the driving force may be generated by a motor. Also, when the engine control signal is indicative of engine-off (i.e., 0 rpm), the connection between the wheels and the output shaft of the engine may be interrupted so that the vehicle is placed in a neutral state.

Also, the brake actuator 25 is an actuator that regulates the brake pressure in the wheel cylinders of each wheel. Upon receiving a brake control signal from the acceleration/deceleration control unit 23, the brake actuator 25 operates according to that brake control signal and regulates the brake, pressure in the wheel cylinders. Incidentally, when the system is applied to a hybrid vehicle, a regenerative brake may also be used as the brake.

2. Routines

Next, examples of routines in this system according to the example embodiment structured in this way will be described below in detail with reference to FIGS. 2 to 6.

[Basic Routine]

First, a basic routine of the vehicle motion control apparatus 100 according to the example embodiment will be described in detail with reference to FIG. 2, which is a flowchart illustrating an example of a basic routine of the vehicle motion control apparatus 100 according to this example embodiment.

An optimum operating pattern is unable to be analytically introduced taking into account various nonlinear information such as the gradient to generate an operating pattern for automatic driving to run the vehicle with ideal (i.e., good) fuel efficiency. Therefore, an optimum operating pattern must be introduced using optimization processing. However, introducing the engine stopped state (i.e., 0 rpm), which is important for achieving good fuel efficiency in a hybrid vehicle, as it is into the optimization processing is difficult because the engine efficiency tends to fall to the local minimum. Therefore, in this example embodiment, changes are made to perform optimization processing by generating a running pattern in which accelerating and coasting are repeated. That is, in this example embodiment, a running state in an operating pattern and the like is first calculated without taking total optimization into account, and then optimization processing is performed by applying separate evaluation functions to each of the road sections according to the running state. As a result, an operating pattern (i.e., a running pattern) that further improves fuel efficiency is calculated while introducing a running pattern in which accelerating and coasting are repeated.

Figure 2:
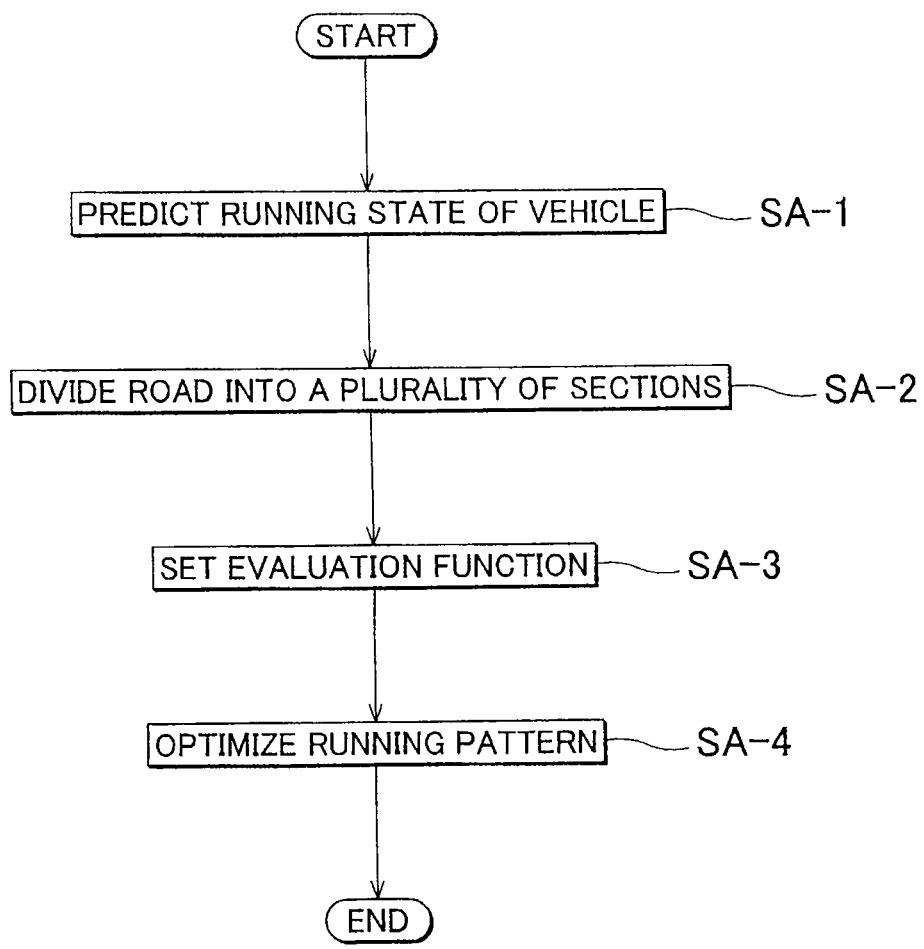
FIG. 2 is a flowchart illustrating an example of a basic routine of the vehicle motion control apparatus in the example embodiments of the invention.

As shown in FIG. 2, first, the running state predicting portion 102a predicts the running state (i.e., a state quantity) when the vehicle will travel on the road, based on the road shape information stored in the road shape information file 106a (step SA-1). Here, the running state predicting portion 102a may calculate an operating pattern predicted when the vehicle will travel on the road, based on the road shape information, by processing in the operating pattern calculating portion 102b, or calculate the friction circle use rate predicted when the vehicle will travel on the road, by processing in the friction circle use rate calculating portion 102c.

Then the evaluation function setting portion 102d divides the road into a plurality of road sections based on a state quantity (i.e., operating pattern, friction circle use rate, etc.) predicted by the running state predicting portion 102a (step SA-2). Here, the evaluation function setting portion 102d may also divide the road into an acceleration section and a deceleration section based on the operating pattern calculated by the operating pattern calculating portion 102b of the running state predicting portion 102a.

Then, the evaluation function setting portion 102d sets an evaluation function for each section of the divided road (step SA-3). For example, for the acceleration section, the evaluation function setting portion 102d sets an evaluation function that evaluates a medium or high engine speed as more preferable than an engine speed that is near zero, and for the deceleration section, the evaluation function setting portion 102d sets an evaluation function that evaluates an engine speed that is near zero as more preferable than a medium or high engine speed. That is, as the acceleration section evaluation function, the evaluation function setting portion 102d sets a concave function in which the evaluation value is lowest near a medium engine speed where the thermal efficiency is the best, and as the deceleration section evaluation function, the evaluation function setting portion 102d sets a concave function in which the evaluation value is lowest near an engine speed of zero with only the rolling resistance.

Then the running pattern optimizing portion 102e optimizes the running pattern of the vehicle that will travel on the road, based on the evaluation functions set for each road section by the evaluation function setting portion 102d (step SA-4). Here, the running pattern optimizing portion 102e may use the position of the division between the road sections as a variable condition in the optimization processing. That is, when the operating pattern of the generated running pattern changes from the operating pattern calculated by the operating pattern calculating portion 102b such that the engine speed or the like is over or under threshold value for setting the road section by the evaluation function setting portion 102d while the repetition processing in the optimization processing is being performed, the running pattern optimizing portion 102e may change the length of a road section accordingly.

With this, the basic routine of the vehicle motion control apparatus 100 ends. Accordingly, it becomes possible to obtain total optimization of the fuel efficiency, including engine operation and engine stop, while avoiding the local minimum problem caused by discontinuity in the thermal efficiency of the engine. The running pattern calculated as described above becomes the vehicle motion control value which is provided for vehicle driving control by being output to the steering control unit 21 and the acceleration/deceleration control unit 23 and the like by the vehicle motion control portion 102f. That is, the vehicle motion control apparatus 100 outputs, at regular intervals of time, a steering control signal to the steering control unit 21 and an engine control signal or a brake control signal to the acceleration/deceleration control unit 23 and the like based on difference between the optimum running pattern and the actual vehicle state (i.e., the position of the host vehicle according to the road shape information inputting device 11, the operation amounts according to the input from various operation amount sensors (i.e., the steering wheel operation amount sensor 12, the brake operation amount sensor 13, and the accelerator operation amount sensor 14), the yaw rate according to the input from the yaw rate sensor 15, and the vehicle speed according to the input from the wheel speed sensors 16, and the like), such that the vehicle runs according to the obtained optimum running pattern.

2-1. Routine of the First Example Embodiment

Figure 3:
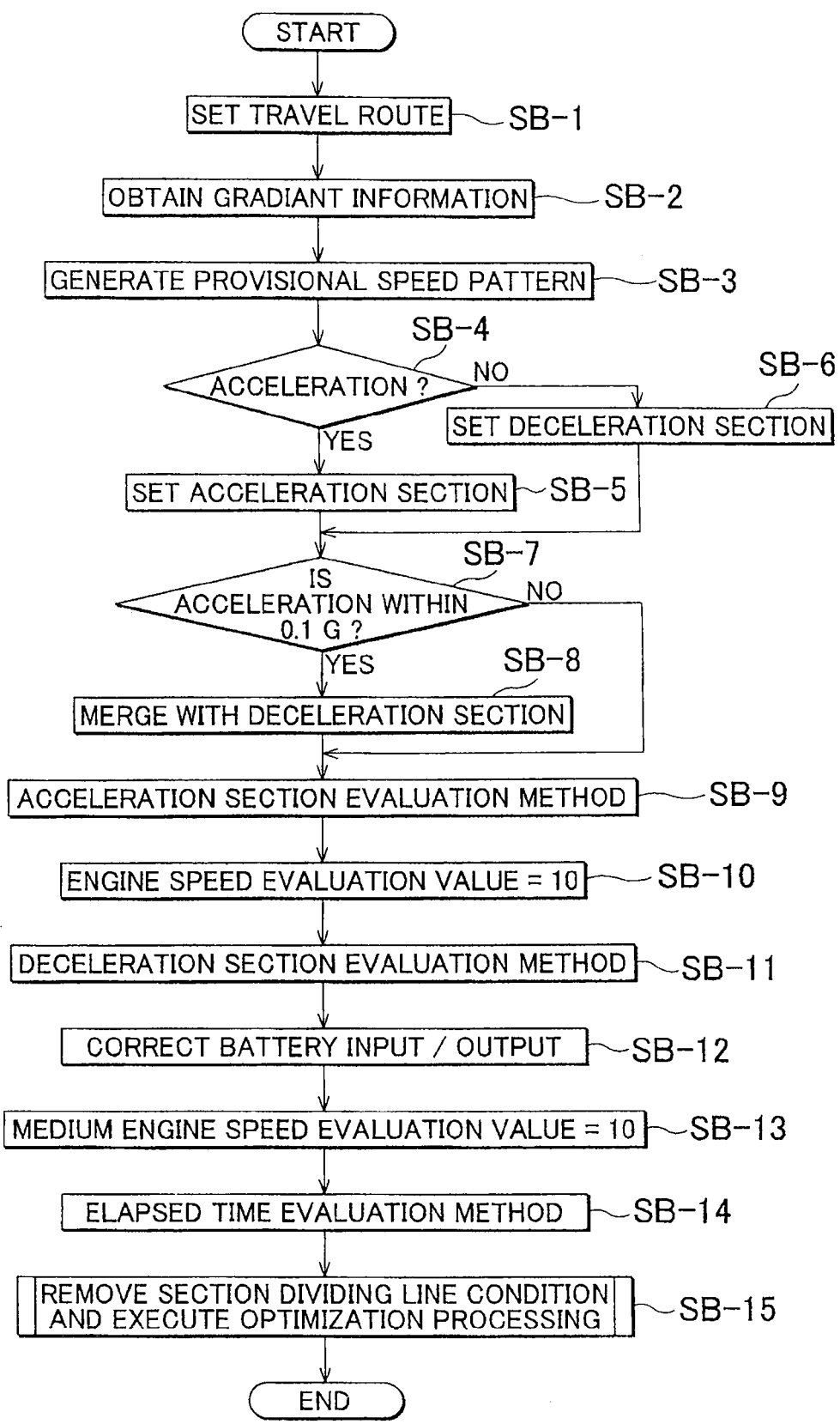
FIG. 3 is a flowchart illustrating an example of a routine of the vehicle motion control apparatus according to a first example embodiment of the invention.
Figure 4:
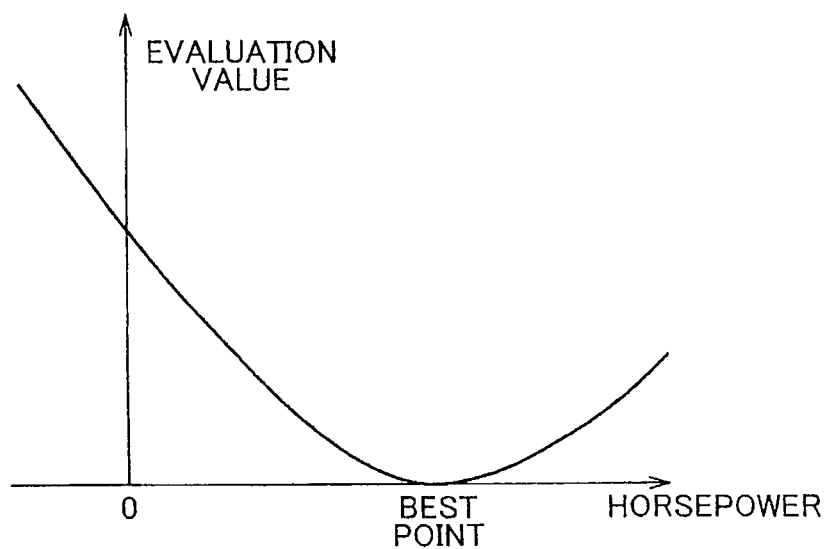
FIG. 4 is an example graph of an evaluation method for an acceleration section.
Figure 5:
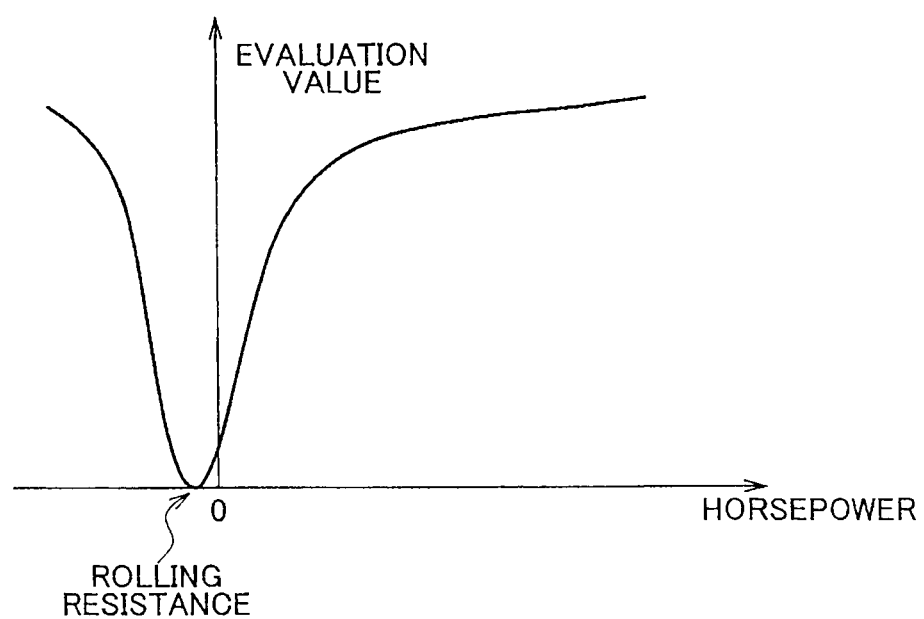
FIG. 5 is an example graph of an evaluation method for a deceleration section.

Next, a routine of the vehicle motion control apparatus 100 according to the first example embodiment will be described in detail with reference to FIGS. 3 to 5. FIG. 3 is a flowchart illustrating the routine of the vehicle motion control apparatus 100 according to the first example embodiment.

In the first example embodiment, the vehicle motion control apparatus 100 generates an operating pattern without taking total optimization into account, with respect to the input (running conditions) from the devices that detect the various state quantities related to the vehicle and the road and the like (i.e., the road shape information inputting device 11 and the lane recognition sensor 17 and the like). Then the vehicle motion control apparatus 100 calculates the operating pattern again, this time taking total optimization into account, using different evaluation methods for the acceleration section and the deceleration section, after which the vehicle motion control apparatus 100 outputs a vehicle running control value based on the optimized running pattern (i.e., operating pattern).

As shown in FIG. 3, first, the vehicle motion control apparatus 100 directs the user (e.g., the driver) to set a destination via the road shape information inputting device 11, performs a route search by the processing in the road shape information inputting device 11, obtains a travel route, and stores that travel route in the road shape information file 106a (step SB-1).

Then the vehicle motion control apparatus 100 obtains gradient information such as information about gradient changes along the travel route using the functions of the navigation system of the road shape information inputting device 11 or the like, telematics, or communication and the like, and stores that gradient information in the road shape information file 106a (step SB-2).

Then the vehicle motion control apparatus 100 performs a simulation according to the travel route using logic without taking total optimization into account (i.e., optimum logic only at or near that location), by the processing in the operating pattern calculating portion 102b, and generates a provisional operating pattern along the travel route (step SB-3).

An example of this logic that does not take total optimization into account is logic that uses technology for producing sinusoidal running or zigzag running, i.e., logic that generates a sinusoidal running pattern in which accelerating, in which the vehicle is accelerated to a target upper limit vehicle speed using the driving force of the engine 24 after reaching a target lower limit vehicle speed, and coasting, in which the vehicle is made to coast to the target lower limit vehicle speed by interrupting the transmission of driving force from the engine to the driving wheels after reaching the target upper limit vehicle speed, are alternated repeatedly. The vehicle speed when the accelerator is being depressed by the driver, for example, may be set as the target upper limit vehicle speed, and the vehicle speed difference between the target upper limit vehicle speed and the target lower limit vehicle speed may be a predetermined value which may be increased or decreased taking the road gradient into account. Incidentally, if one cycle from accelerating to the end of coasting is shorter than a reference value, the cycle may be correcting, i.e., lengthened, and a sinusoidal running pattern may be generated. For example, the acceleration section may be corrected, i.e., lengthened, by decreasing the amount of acceleration when accelerating, and the coasting section may be corrected, i.e., lengthened, by adding driving force from power assist when coasting. Also, the cycle may be corrected, i.e., lengthened, by adding a steady travel section between the acceleration section and the coasting section. Incidentally, the logic that generates this sinusoidal running is only an example. As long as an engine, i.e., a power generating device, is used, this example embodiment can be applied over a wide range in an attempt to greatly improve fuel efficiency from the thermal efficiency characteristic (i.e., the discontinuous characteristic in which there is a low speed region with poor thermal efficiency between an engine speed of zero and a medium engine speed).

Continuing on, the vehicle motion control apparatus 100 sets a section where the acceleration is equal to or greater than a predetermined value (such as 0 G) (Yes in step SB-4) as an acceleration section (step SB-5), and sets a section where the acceleration is less than the predetermined value (such as 0 G) (No in step SB-4) as a deceleration section (step SB-6), based on the generated running pattern, by the processing in the evaluation function setting portion 102d.

When there is an acceleration section in which the maximum acceleration is less than a predetermined value (such as 0.1 G) after a deceleration section (i.e., Yes in step SB-7), the vehicle motion control apparatus 100 merges it with the deceleration sections before and after that acceleration section to create a single deceleration section by processing in the evaluation function setting portion 102d (step SB-8). This processing is performed because there is a possibility that there may be frequent switching between the acceleration section and the deceleration section near an area of steady travel. The evaluation function setting portion 102d merges the sections by providing hysteresis up to a power assist limit (such as 0.1 G) in the hybrid system.

Then the vehicle motion control apparatus 100 sets an evaluation method that determines that a medium or higher engine speed is preferable (compared with an engine speed of zero), for the acceleration section, by processing in the evaluation function setting portion 102d (step SB-9). More specifically, the vehicle motion control apparatus 100 obtains the thermal efficiency rate (a numerical value of 1 or higher) at each point when the best point for the thermal efficiency of the engine 24 (the best point is, for example, approximately 40 km/h at approximately one-half of maximum horsepower) is given a numeral value of 1, and sets the difference between each of all of the obtained thermal efficiency rates and 1 as the evaluation method. In this case, the best point for the thermal efficiency is 0, so the rate at which the thermal efficiency at any other point is poor becomes the evaluation value. Here, the hybrid system thermal efficiency in which the thermal efficiency of the engine 24 is multiplied by the conversion efficiency of the transmission (MG1+MG2) (e.g., an 80% loss with respect to the converted energy) may also be used.

Meanwhile, the vehicle motion control apparatus 100 sets the evaluation value when the engine speed is zero to a constant value greater than 0 (such as 10) with the evaluation method for the acceleration section by the processing of the evaluation function setting portion 102d (step SB-10). That is, originally in the evaluation method, an engine speed of zero is one point with good thermal efficiency, so 0 (i.e., the same as the best point) should be employed. However, once an engine speed of zero is selected in the optimization processing, it is no longer possible to return to the preferred medium engine speed (because the engine efficiency falls to the local minimum), so a relatively poor numerical value is set irrespective of the actual engine efficiency. Here, FIG. 4 is an example graph of an evaluation method for an acceleration section set as described above. As shown in FIG. 4, the acceleration section evaluation method is a function in which the evaluation value near an engine speed of zero is a predetermined value greater than 0, when the evaluation value at the best point at which the thermal efficiency of the engine 24 is the best is 0.

Also, the vehicle motion control apparatus 100 sets an evaluation method that evaluates an engine speed of zero as preferable (compared with a medium or high engine speed), for the deceleration section by the processing in the evaluation function setting portion 102d (step SB-11). More specifically, the vehicle motion control apparatus 100 sets, as the evaluation method, a numerical value at which the loss (such as 36%) of the battery input/output and the MG2 input/output in the hybrid system is proportionate to the acceleration/deceleration energy removed from the rolling resistance deceleration (e.g., a deceleration of –0.03 G) when the rolling resistance (e.g., a deceleration of –0.03 G) is 0 as a reference.

Then the vehicle motion control apparatus 100 performs a correction according to the state-of-charge (SOC) of the battery in the evaluation method for the deceleration section, by the processing in the evaluation function setting portion 102d (step SB-12). That is, with power acceleration (such as +0.1 G) when the battery is fully charged (i.e., in a state in which it cannot be charged any more considering durability and the like), or regeneration (such as with a deceleration of –0.1 G) when the battery is empty (i.e., dead or drained), that loss is decrease-corrected (to 20% for example) in order to avoid bad events that lead to energy waste (i.e., regeneration not possible due to the battery being fully charged, or power acceleration not possible due to insufficient power in the battery).

Meanwhile, the vehicle motion control apparatus 100 sets the evaluation value when the engine speed is a medium or high engine speed to a constant value greater than 0 (such as 10) with the evaluation method for the deceleration section above by the processing in the evaluation function setting portion 102d (step SB-13). That is, originally in the evaluation method, near the best point for the thermal efficiency of medium engine speed, a value near 0 (the same as with the acceleration section) should be employed. However, once a medium or high engine speed is selected in the optimization processing, it is no longer possible to return to an engine speed near zero (because the engine efficiency falls to the local minimum), so a relatively poor numerical value is set irrespective of the actual engine efficiency. Here, FIG. 5 is an example graph of an evaluation method for a deceleration section set as described above. As shown in FIG. 5, the deceleration section evaluation method is a function in which the evaluation value of a medium or high engine speed at which the thermal efficiency of the engine is good is a predetermined value greater than 0, when the evaluation value for running according to rolling resistance is 0.

Then the vehicle motion control apparatus 100 sets an evaluation method related to the elapsed time in addition to the evaluation method related to fuel efficiency above, by the processing in the evaluation function setting portion 102d (step SB-14). This is because when the evaluation method for only fuel efficiency is used, in a hybrid vehicle with a Toyota Hybrid System (THS), for example, it is likely that the average speed will end up being 20 km/h and not match the desire of the user (i.e., an actual occupant or driver). Therefore, an evaluation method for increasing the average speed in a way that will not greatly reduce fuel efficiency is set by appropriate weighting or the like.

Then the vehicle motion control apparatus 100 performs optimization processing (such as Sequential Conjugate Gradient-Restoration Algorithm (SCGRA) or the like) with the position of the division between the sections that is fixed in normal optimization technology as a variable condition, by processing in the running pattern optimizing portion 102e (step SB-15).

With this, the routine of the first example embodiment ends. Accordingly, an operating pattern (i.e., running pattern) that further improves fuel efficiency can be obtained while introducing an operating pattern that stops the engine and thus provides better fuel efficiency.

2-2. Routine of a Second Example Embodiment

Next, a routine of the vehicle motion control apparatus 100 according to a second example embodiment will be described in detail with reference to FIG. 6 which is a flowchart of an example of a routine of the vehicle motion control apparatus 100 according to the second example embodiment.

In the first example embodiment described above, optimal results can be obtained as long as only longitudinal direction control by operating pattern generation and acceleration and deceleration on a straight road is performed. However, with a road shape in which the friction circle needs to be taken into account in running stability, the operating pattern may become unstable (i.e., the speed is too high so the vehicle is unable to make a turn). Therefore, in this second example embodiment, processing is performed taking into account a case in which the optimum operating pattern and running pattern are not obtained because the optimum distribution of regenerated force and the running pattern are not appropriate with a method that simply uses the speed limit for each curve. That is, in this second example embodiment, the vehicle motion control apparatus 100 calculates an operating pattern using a different evaluation method for a case in which the friction circle use rate is relatively high and a case in which the friction circle use rate is relative low. When the friction circle use rate is relatively low, the vehicle motion control apparatus 100 uses the evaluation method illustrated in the first example embodiment. When the friction circle use rate is relatively high, the vehicle motion control apparatus 100 introduces an evaluation method that emphasizes thermal efficiency based on the engine speed together with the hybrid system in the acceleration section. That is, when the friction circle use rate is obtained again from the operating pattern calculated according to the first example embodiment, the vehicle motion control apparatus 100 sets an evaluation method with different logic than the first example embodiment when the friction circle use rate will be in a dangerous friction circle use region (such as 70%).

Figure 6:
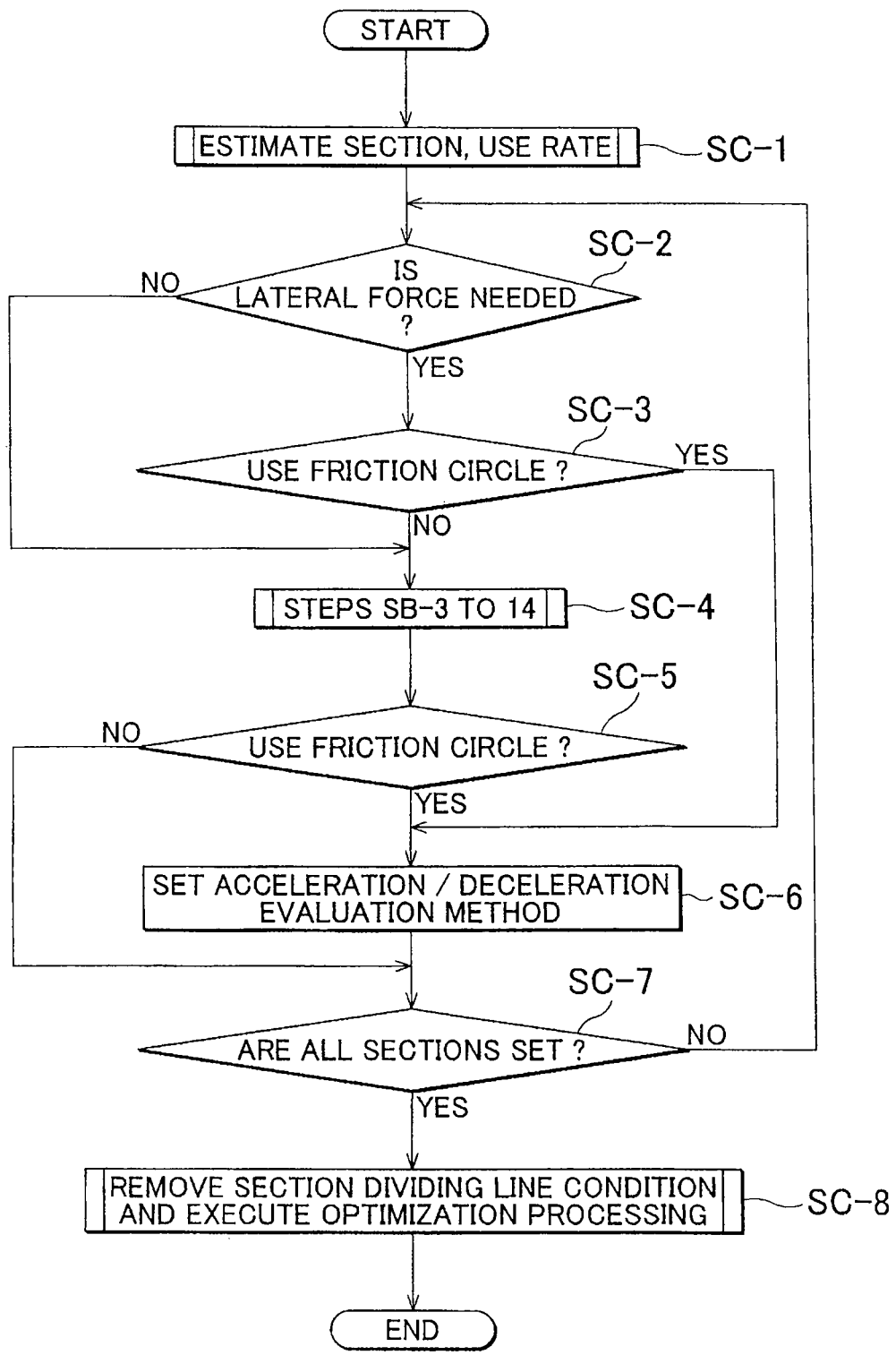
FIG. 6 is a flowchart illustrating an example of a routine of a vehicle motion control apparatus according to a second example embodiment of the invention.

As shown in FIG. 6, first the vehicle motion control apparatus 100 temporarily estimates the road section based on the speed pattern by calculating the friction circle use rate based on the road shape information stored in the road shape information file 106a, using logic that takes into account the friction circle, by the processing of the friction circle use rate calculating portion 102c (step SC-1).

One example of such logic that takes the friction circle into account is logic that uses technology for generating an ideal pattern and operating pattern, i.e., logic that applies technology that derives the running pattern by converge-calculating a restraint condition that includes friction circle limit and road boundary line conditions, and when this restraint condition is satisfied, performing a converge-calculation by an evaluation function related to fuel efficiency (e.g., an evaluation function related to fuel efficiency such as an evaluation of speed dispersion, an evaluation of the total amount of heat radiation from braking deceleration, an evaluation of power supplied when the power supply is positive in the hybrid system, and an evaluation of the thermal efficiency use rate of the engine output thermal efficiency during acceleration or the like), in a vehicle having a hybrid type drive system.

Compared with decelerating using the deceleration capabilities of the entire vehicle (i.e., deceleration by regenerative braking+deceleration by hydraulic braking), decelerating only by regeneration taking fuel efficiency into account results in there being leeway in the deceleration amount by hydraulic braking when decelerating, such that there is leeway in the longitudinal force. Therefore, supposing that deceleration is performed only by regeneration taking into account the friction circle limit from lateral force and longitudinal force, the amount of leeway in the longitudinal force can be distributed to the lateral force when decelerating on a curved road. Therefore, with logic that takes this friction circle into account, on a curved road, the running curve is increased using that amount of leeway when decelerating, and there is no leeway during accelerating, so a running pattern close to a straight line is generated. More specifically, the clipping point is moved toward the beginning of the curve and the minimum speed point is set toward the end of the curve, and a running pattern is generated by combining these in a smooth curve (such as a clothoid curve). Also, the first half of the curve up until the minimum speed point is set as the deceleration section, and the second half of the curve from the minimum point is set as the acceleration section. Accordingly, when generating the running pattern, it is possible to calculate a running pattern (i.e., a running pattern) that takes into account vehicle running stability and fuel efficiency, using the use rate of the friction circle that accounts for the lateral force from traveling around the curve and the longitudinal force from accelerating and decelerating. Incidentally, the logic that uses the friction circle described above is only an example. The invention is not limited to this as long as the technology generates a fuel efficient running pattern within the friction circle limit.

If no lateral force is needed (such as in a section where the lateral G is within 0.1 G) (i.e., No in step SC-2), or if lateral force is needed (i.e., Yes in step SC-2) but the friction circle use rate is relatively low (i.e., No in step SC-3), the vehicle motion control apparatus 100 sets the evaluation method and the road sections according to the routine of the first example embodiment (e.g., steps in SB-3 to 14) by the processing in the evaluation function setting portion 102d (step SC-4).

Also, if lateral force is needed (i.e., Yes in step SC-2) and the friction circle use rate is relatively high (such as 50% or higher) (Yes in step SC-3), or if the friction circle use rate is relatively high as a result of recalculating the friction circle use rate after the process in step SC-4 (i.e., Yes in step SC-5), the vehicle motion control apparatus 100 sets an evaluation method to obtain deceleration by regeneration and power assist based on the engine being off (0 rpm, rolling resistance deceleration) for the deceleration section (such as the first half of the curve), and sets an evaluation method to obtain acceleration with an emphasis on thermal efficiency based on the engine operating state together with the hybrid system, for the acceleration section (such as the second half of the curve), by the processing in the evaluation function setting portion 102d (step SC-6).

Then the vehicle motion control apparatus 100 performs steps SC-2 to 6 above in all of the sections (step SC-7), removes the restraint condition of the position of the division between the deceleration section and the acceleration section (i.e., makes it a variable condition), and performs optimization processing (such as SCGRA) to be able to increase or decrease the lengths of the sections (step SC-8).

With this, the routine of the second example embodiment ends. Accordingly, an optimum operating pattern (i.e., running pattern) with excellent running stability even on a curved road can be generated, so ideal running control that achieves both running stability and good fuel efficiency is possible.

3. Summary of the Example Embodiment, and Other Example Embodiments

According to this example embodiment, the running state (i.e., the state quantity) when the vehicle will travel on a road is predicted based on the road shape information stored in the road shape information file. The road is then divided into a plurality of road sections based on the predicted running state (i.e., the state quantity), an evaluation function is set for each road section, and the running pattern of the vehicle that will travel on the road is calculated based on the evaluation function set for each road section. As a result, the local minimum problem due to the discontinuity of the engine characteristics can be avoided without fixing the operating pattern, so total optimization with respect to fuel efficiency or the like can be improved.

Also, according to this example embodiment, the running pattern is calculated with the position of the division between road sections as a variable condition. Accordingly, optimization along the entire travel route can be performed, not just localized optimization in a road section, with the set road sections as a variable condition, not a restraint condition.

Further, according to this example embodiment, the operating pattern is calculated when the vehicle will travel on a road based on the road shape information stored in the road shape information file. The road is then divided into at least an acceleration section and a deceleration section as the road sections based on the calculated operating pattern, and an acceleration section evaluation function is set for the acceleration section and a deceleration section evaluation section is set for the deceleration section. Therefore, total optimization related to the evaluation of fuel efficiency can be improved by setting appropriate evaluation functions for the acceleration and deceleration sections according to the operating pattern.

Also, according to this example embodiment, an evaluation function that evaluates a medium or high engine speed as more preferable than an engine speed near zero is set for the acceleration section. More specifically, the rate of the thermal efficiency at each point when the best point for thermal efficiency of the engine is given a numerical value of 1, and an evaluation function in which the difference between each of all of the obtained thermal efficiency rates and 1 is the evaluation value is set for the acceleration section, and the evaluation value near an engine speed of zero is given a numerical value greater than 0. As a result, even if the thermal efficiency of the engine has a discontinuous characteristic in which the efficiency is good at an engine speed of zero and at a medium engine speeds or higher, it is possible to set an evaluation function that evaluates acceleration of a medium engine speed or higher in which the thermal efficiency is good, for the acceleration section. Accordingly, it is possible to appropriately avoid the local minimum problem caused by discontinuity in the engine characteristics, and thus improve total optimization.

Further, according to this example embodiment, an evaluation function that evaluates an engine speed that is pear zero as more preferable than a medium or high engine speed is set for the deceleration section. More specifically, an evaluation function in which the numerical value at which the loss of the energy input/output in the hybrid system is proportionate to the acceleration/deceleration energy removed from the rolling resistance deceleration is the evaluation value, when the rolling resistance is 0 as a reference, is set for the deceleration section, and the evaluation value when the engine speed is a medium or high engine speed is given a numerical value larger than 0. As a result, even if the thermal efficiency of the engine has a discontinuous characteristic in which the efficiency is good at an engine speed of zero and at a medium engine speed or higher, it is possible to set an evaluation function that evaluates deceleration from the engine speed being zero, in the deceleration section. Accordingly, it is possible to appropriately avoid the local minimum problem caused by discontinuity in the engine characteristic, and thus improve total optimization.

Also, according to this example embodiment, the friction circle use rate predicted when the vehicle will travel on a road is calculated based on the road shape information stored in the road shape information file, and different evaluation functions are set for a road section where the calculated friction circle use rate is relatively high and a road section where the calculated friction circle use rate is relatively low. More specifically, an evaluation function that evaluates acceleration that emphasizes thermal efficiency based on the engine operating state together with the hybrid system as preferable is set for the acceleration section, and an evaluation function that evaluates regeneration and power assist based on the engine being off as preferable is set for the deceleration section. As a result, it is possible to calculate the optimum running pattern with respect to fuel efficiency, while taking the running stability of the vehicle into account also by using the friction circle.

While example embodiments of the invention have thus far been described, the invention may also be carried out by various other example embodiments that differ from those described above, within the scope of the technical aspects described in the claims for patent.

In particular, in the example embodiment described above, an example is described in which the running pattern calculating apparatus of the invention is mounted in a vehicle and structured as a running control unit, and automatic driving control is performed based on a calculated ideal running pattern. However, the invention may also be applied to a vehicle that performs various kinds of driving assist using an optimal path with respect to manual driving. That is, while it is ultimately preferable to perform automatic driving control, it is difficult to ignore the intentions and desires of the user (i.e., the driver) in the current transition, so technology that finds a compromise between the ideal operating pattern (running pattern) generated by the invention and an operation by the user may be employed.

Also, in the example embodiment described above, an example is described in which the invention is applied to a hybrid system (i.e., a hybrid vehicle) in which an internal combustion engine and a motor are combined as the driving source, but the invention is not limited to this. That is, the invention may similarly be applied in a system in which an engine is able to be stopped while the vehicle is traveling. Also, with a heat engine which consumes only a small amount of fuel when idling, coasting can also be performed by simply interrupting the transmission of driving force from the heat engine to the wheels without stopping the heat engine. More specifically, the invention can be applied to a vehicle as long as that vehicle is one in which an automatic transmission can be controlled to a neutral state while the vehicle is traveling. Also, considering the realization of plug-in hybrid vehicles as well, it is preferable to obtain total optimization for a single trip (from one charging location to the next charging location), in order to generate an optimum operating pattern. However, to obtain total optimization, it is difficult to analytically obtain a unique operating pattern by some mathematical expression when considering the reality of various nonlinear conditions being applied in combination. Therefore, optimization technology, some of which is already being used commercially in vehicles, such as Vehicle Safety Communication (VSC) may be used.

Also, in the example embodiments described above, an example is described the running pattern calculating apparatus of the invention is mounted in a vehicle and used on-line. However, the structure of the invention is not limited to this. That is, an optimum running pattern for fuel efficiency may also be calculated off-line without the running pattern calculating apparatus being mounted in a vehicle.

Also, regarding the vehicle motion control apparatus 100, the constituent elements in the drawings are functional concepts and do not necessarily have to have a physical structure as shown in the drawings. In particular, the vehicle motion control apparatus 100 may be formed by a plurality of ECUs, not just a single ECU. The functions of the steering control unit 21 and the acceleration/deceleration control unit 23 may also be realized by the vehicle motion control apparatus 100.

Further, the invention may be carried out by various other example embodiments that differ from those described above, within the scope of the technical aspects described in the claims for patent. For example, of the processes described in the example embodiments above, all or some of the processes that are described as being performed automatically may also be performed manually, or all or some of the processes that are described as being performed manually may also be performed automatically according to any well-known method. Also, information including recorded data, and parameters of processes or routines, specific names, control procedures, routine procedures illustrated in the drawings and the specification, may be modified as appropriate, except for when otherwise specified. Further, the specific ways in which devices and the like are divided or combined are not limited to those shown in the drawings. That is, all or some may be functionally or physically combined in appropriate units according to various additions and the like or according to functional load. Also, in the example embodiments described above, the vehicle motion control apparatus 100 performs the routines in a stand-alone mode. However, the vehicle motion control apparatus 100 may also be structured to process information according to a request by an ECU formed in a case separate from the vehicle motion control apparatus 100, and return the processing results to that ECU.

Also, the invention may also be structured by a program that realizes the various means of the vehicle motion control apparatus 100 by being read by a computer, or a program that executes the steps of the running pattern calculating method by being read by a computer, and the program may be stored on a storage medium that can be read by a computer. The storage medium in this case includes a suitable transportable physical medium such as a flexible disk, a magneto optical (MO) disk, ROM, EPROM, EEPROM, a CD-ROM, or a DVD. Also, the term program refers to a data processing method written in an appropriate language by a description method without any distinction according to format, e.g., source code or binary code. Incidentally, the program is not necessarily limited to having a homogeneous structure. Alternatively, it may be distributed as a plurality of modules or libraries, or achieve its function in cooperation with a separate program represented by an operating system (OS). Incidentally, well-known structures or procedures may be used for the specific structure for reading the storage medium in the devices illustrated in the example embodiments, the reading procedure, or the installation procedure after reading, and the like.

[Third Example Embodiment] Next, a third example embodiment of the invention will be described with reference to the drawings. Incidentally, an example in which there is an emphasis on fuel efficiency in the travel plan will be described, but the invention is not limited to this example embodiment.

First, the outline of the third example embodiment will be described. Known representative examples of a fuel efficiency assist system include "ECO mode" by Toyota Motor Corporation, "ECON" by Honda Motor Co., Ltd., and "SI-DRIVE" by Fuji Heavy Industries Ltd. The systems of these companies are also referred to as light accelerator assist control or ECO mode control, and change the accelerator input by the driver into input that will moderately improve fuel efficiency. Also, these systems enable the driver to select the mode with a switch or the like.

However, with these systems, the operational input by the driver is the agent (the solution), and moreover, the control unit is unable to determine whether the operational input of the accelerator or the brake by the driver is needless (there is no objective for this determination). Therefore, with these systems, the operational input by the driver remains central, and the control unit is unable to do anything but assist slightly in order to improve fuel efficiency. As a result, with these systems, fuel efficiency is only improved by approximately 5% (a nominal value). More significant improvements in fuel efficiency are difficult.

Therefore, with this third example embodiment, the control unit generates a target speed pattern or a target acceleration pattern (a control amount related to speed) according to a given course (a target travel route) and a task (including, for example, destination, target arrive time at a destination, and fuel efficiency emphasis and the like), divides the generated target speed pattern or target acceleration pattern into sections according to the running state (i.e., the running pattern), and then actively switches the assist control for improving fuel efficiency according to the section, which enables the fuel efficiency to be significantly increased compared with related systems.

The method of this third example embodiment (i.e., good fuel efficiency assist control using section definitions) enables the fuel efficiency to be improved significantly compared with related fuel efficiency assist systems. On the other hand, active assist control and the switching thereof may feel unpleasant or abrupt to the driver. Incidentally, there are eco indicators and shift indicators and the like that determine and evaluate whether an operation such as an accelerator or shift operation by the driver is good or bad, according to fuel efficiency. Also, Japanese Patent Application Publication No. 2002-370560 (JP-A-2002-370560) describes technology that sets a target acceleration/deceleration speed (i.e., a target pattern) to improve fuel efficiency in each section of a planned travel route based on anticipatory information of the planned travel route (i.e., curved road, inclined road), and indicates the difference between the actual acceleration and the target acceleration (shown broken down into an economical region, a semi-economical region, and an uneconomical region). Also, Japanese Patent Application Publication No. 2009-149286 (JP-A-2009-149286) describes technology for reducing $CO_2$ by providing information regarding fuel efficient accelerator work to the driver by showing the appropriate accelerator operation on a display in the vehicle.

However, with these related technologies such as the indicator, the input of the driver is evaluated, so it is not possible to determine whether that input is needless.

Therefore, in the third example embodiment, human-machine interface (HMI) elements are classified into three categories, i.e., manifestation, presentation, and evaluation. Establishing HMI corresponding to these categories suppresses the feelings of unpleasantness and abruptness that the driver may have when the vehicle is actively assist-controlled or when that assist control switches. Furthermore, this third example embodiment seeks cooperation from the driver for achieving a task, and as a result, is able to realize performance with great improvements in fuel efficiency.

The manifestation element enables the driver to know what the control unit is trying to do at that moment and what kind of assistance it is trying to provide. The presentation element enables the driver to know what the control unit wants him or her to do at that moment. The evaluation element enables the driver to know how much an operation or input that he or she performed contributed to achieving a task.

Figure 7:
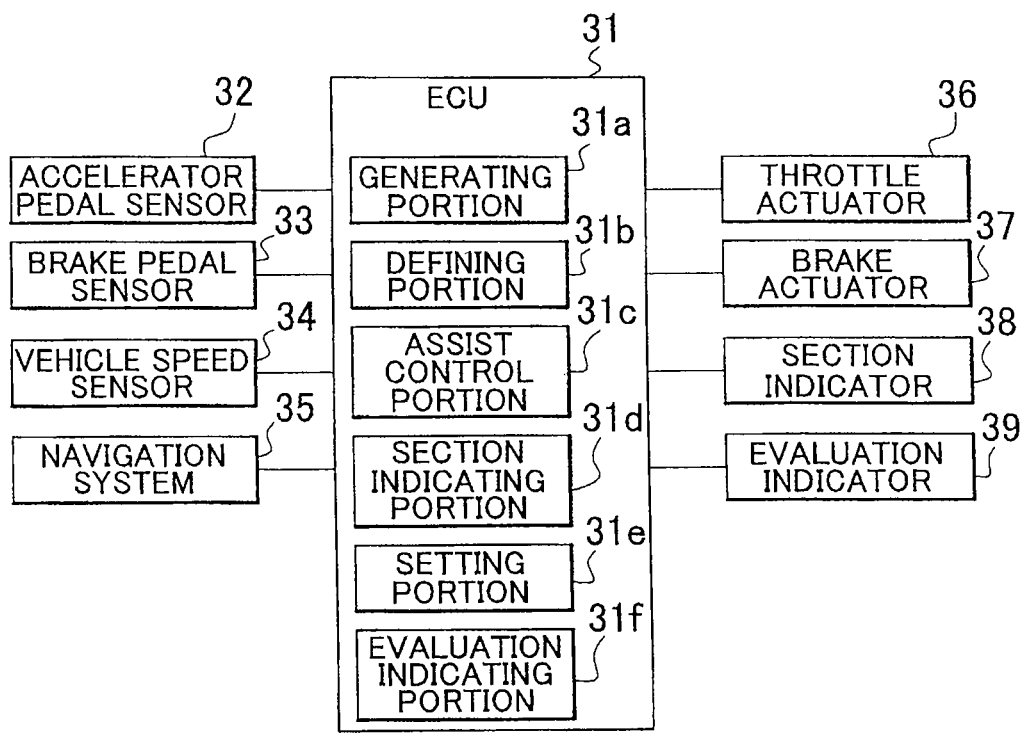

Continuing on, the structure of the electronic control unit (ECU) and the like in the third example embodiment will be described. FIG. 7 is diagram showing the structure of the ECU and the like.

As shown in FIG. 7, an ECU 31 (including the assist control unit according to the invention) that is mounted in a vehicle, an accelerator pedal sensor 32, a brake pedal sensor 33, a vehicle speed sensor 34, a navigation system 35, a throttle actuator 36, a brake actuator 37, a section indicator 38, and an evaluation indicator 39 are provided. The ECU 31 includes a generating portion 31a, a defining portion 31b, an assist control portion 31c, a section indicating portion 31d, a setting portion 31e, and an evaluation indicating portion 31f, as shown in FIG. 7.

Figure 8:
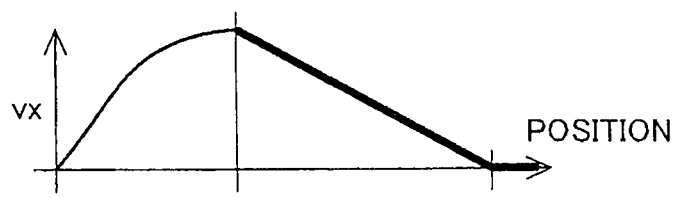
FIG. 8 is a view showing a frame format of an example of a target operating pattern.

The generating portion 31a generates a target speed pattern (or target acceleration pattern) related to a change in the speed (or acceleration) that leads to a result evaluated as optimal in satisfying an intended task of the driver (e.g., the location of a goal, the arrival time, an emphasis on fuel efficiency), based on that intended task and course shape information (such as R information, road surface μ information, etc.). More specifically, when the location of a goal and arrival time at that goal are set as the intended tasks, the generating portion 31a generates a target speed pattern (or target acceleration pattern) evaluated to have the best fuel efficiency in a range that satisfies these set conditions. FIG. 8 is a view an example of a target speed pattern generated by the generating portion 31a.

Figures 9, 10:
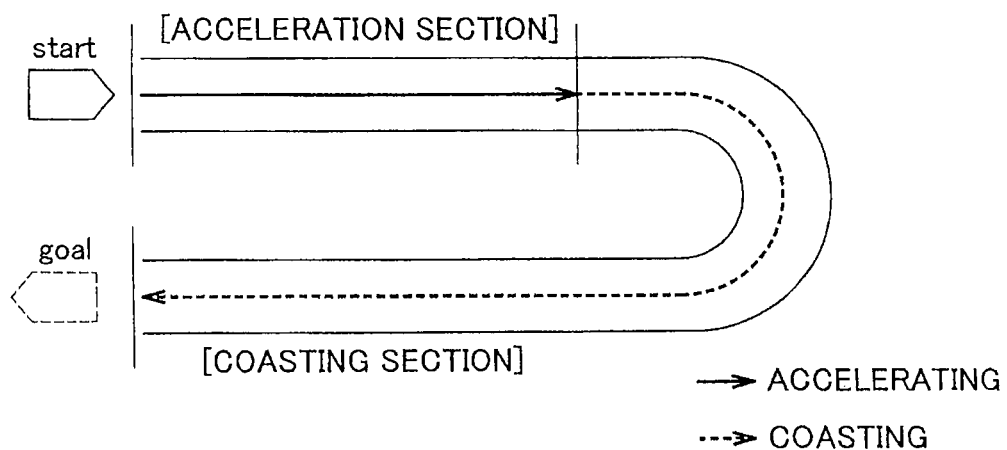
FIG. 9 is a view showing a frame format of an example of an acceleration section and a coasting section.
FIG. 10 is a chart showing an example of the relationship between sections and assist control.

Returning to FIG. 7, the defining portion 31b divides the target speed pattern (or the target acceleration pattern) obtained by the generating portion 31a into sections according to the running state. In other words, the defining portion 31b divides a given course into sections according to the target speed or target acceleration. Here, in order to improve the fuel efficiency as much as possible (and to eliminate needless acceleration in the first place), a speed pattern that avoids unnecessary deceleration is needed. Therefore, in the third example embodiment, "acceleration" and "coasting" without using the engine brake are incorporated as the running state (i.e., the running pattern). Also, in the third example embodiment, in order to emphasize fuel efficiency, the target speed pattern (or the target acceleration pattern) is divided into two sections, i.e., an acceleration section that is a section for increasing speed, and a coasting section that is a section for coasting with only the real rolling resistance. FIG. 9 is a view showing an example of an acceleration section and a coasting section defined by the defining portion 31b corresponding to a course.

Returning again to FIG. 7, the assist control portion 31c executes assist control with an emphasis on fuel efficiency, based on the sections defined by the defining portion 31b and the target speed pattern (or the target acceleration pattern) generated by the generating portion 31a. More specifically, in the acceleration section, the assist control portion 31c executes assist control that restricts (suppresses) needless acceleration (also referred to as needless acceleration restriction (suppression) in this specification) and/or assist control that provides acceleration assist (also referred to as acceleration assist in this specification), according to the difference between the target acceleration and the acceleration required by the driver. In the coasting section, the assist control portion 31c executes assist control that restricts (suppresses) acceleration (also referred to as acceleration restriction (suppression) in this specification) or assist control that provides coasting assist (also referred to as coasting assist in this specification), according to whether the accelerator pedal is being depressed or not. FIG. 10 is a chart showing an example of the relationship between the sections and the assist control.

Here, needless acceleration restriction (suppression) is assist control that restricts or suppresses the input when the required acceleration input by a driver exceeds the target acceleration pattern. Acceleration assist is assist control that increases the input within a range that will not be dangerous nor impart an unpleasant sensation to the driver when the required acceleration input by the driver is less than the target acceleration pattern such that the task set by the driver becomes difficult to achieve.

Here, a coordination method that takes driver discomfort into consideration that can be used to simultaneously realize both assist control that restricts (suppresses) needless acceleration and assist control that provides acceleration assist will be described. The driver required acceleration and the target value for the acceleration set by the driving force control unit are adjusted based on Weber-Fechner's law that the intensity E being proportional to the logarithm of the stimulus R (i.e., $E[dB]=K \times \log(R)$), and an acceleration command value is set. The intensity E has a differential threshold that is an amount of change in the stimulus dE [dB] on the border between whether a change in the current stimulus (i.e., acceleration) will be perceived or not. A differential threshold is set for both an absolute value increase side and an absolute value decrease side of acceleration based on the driver required acceleration.

Incidentally, with the driving force control of the vehicle, the acceleration applied to the driver is the same (or substantially the same) as the acceleration of the vehicle. Therefore, when the acceleration of the vehicle changes, the acceleration applied to the driver also changes just like the acceleration of the vehicle. In other words, the intensity E perceived by the driver can be calculated with the acceleration of the vehicle as the stimulus R, instead of the acceleration applied to the driver.

Also, a threshold dE/dt [dB/s] that is perceived as a change over time in the stimulus is provided. Two values, i.e., one for the absolute value increase side (i.e., a jerk correction quantity upper limit value that will be described later) and one for the absolute value decrease side (i.e., a jerk correction quantity lower limit value that will also be described later), are provided based on a driver required jerk. A guard value is set for both the acceleration (i.e., driving force) and the change rate of the acceleration (an increase in acceleration), based on a differential threshold at which a change in the acceleration is perceived and a differential threshold over time at which a change in the jerk is perceived. Moreover, when the operation amount of the accelerator pedal or the brake pedal by the driver changes greatly in a short period of time, i.e., when the driver desires a large change in acceleration, the guard value for the acceleration increase can be relaxed.

Returning to the description of the assist control portion 31c, acceleration restriction (suppression) is assist control that actively suppresses driver required acceleration in a coasting section when the driver is depressing the accelerator pedal. Incidentally, the assist control that restricts acceleration (i.e., acceleration restriction assist control) is set in this way because it can be determined that there is basically no need to accelerate in the coasting section (i.e., the set task can be sufficiently achieved without accelerating). Coasting assist is assist control that causes the vehicle to coast (sets the torque output by the vehicle to 0) without applying the engine brake, when the driver is not depressing the accelerator pedal.

Here, in the third example embodiment, there are two characteristics (i.e., advantages): 1. the control unit has a target speed/acceleration pattern, and 2. the control unit knows what running state (i.e., running pattern) should be used in any give position (section) of the course (for example, what is needless in the acceleration section). As a result, the control unit can perform active and effective assist control with respect to operational input by the driver.

Figure 11A:
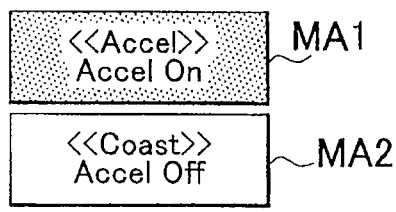
FIGS. 11A and 11B are views of examples of section indicators.
Figure 11B:
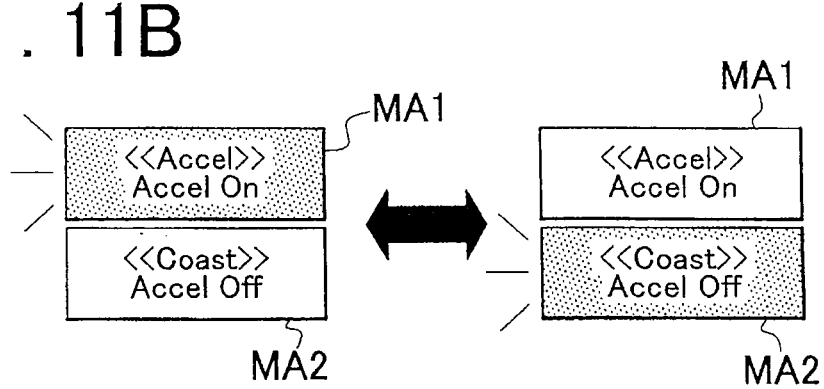

Returning back to FIG. 7, the section indicating portion 31d indicates the status (more specifically, acceleration or coasting) of the running state (the running pattern at the position (section) where the vehicle is currently traveling) on a section indicator 38 provided in the vehicle. Here, an example of the section indicator 38 will be described with reference to FIGS. 11A and 11B. The section indicator 38 is made up of a pair of indicators MA1 and MA2, as shown in FIG. 11A. The indicator MA1 is an indicator for manifesting (i.e., indicating) an acceleration section and presenting (i.e., indicating) what is required of the driver, with characters and lighting up or the like. The indicator MA2 is an indicator for manifesting (i.e., indicating) a coasting section and presenting (i.e., indicating) what is required of the driver, with characters and lighting up or the like. The section indicator 31d switches the indicator MA1 or MA2 that is lit up based on the section information of the current position, as shown in FIG. 11B. Incidentally, in FIGS. 11A and 11B, some examples of the characters are "《 Accel 》 Accel On" that corresponds to an indication that the vehicle is traveling in an acceleration section and the accelerator pedal should be depressed, and "《 Coasting 》 Accel Off" that corresponds to an indication that the vehicle is traveling in a coasting section and the accelerator pedal should not be depressed.

Returning to FIG. 7, the setting portion 31e incrementally sets a score for the difference between the target speed of the target speed pattern and the speed input by the driver (e.g., the difference between the target speed and the driver input speed), or the difference between the target acceleration of the target acceleration pattern and the acceleration input by the driver (e.g., the difference between the target acceleration and the driver input acceleration).

Figure 12A:
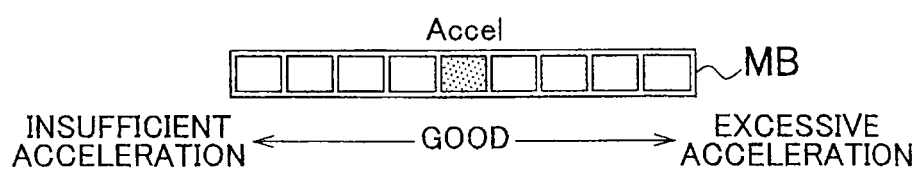
FIGS. 12A and 12B are views of examples of evaluation indicators.
Figure 12B:
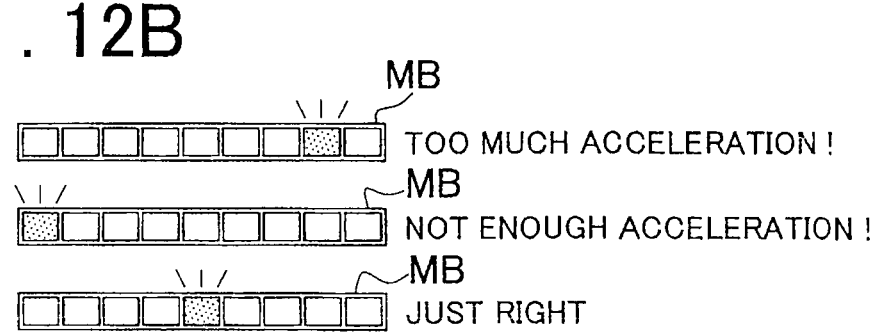

The evaluation indicating portion 31f indicates the score set by the setting portion 31e on an evaluation indicator 39 provided in the vehicle. An example of the evaluation indicator 39 will now be described with reference to FIGS. 12A and 12B. The evaluation indicator 39 is an indicator MB such as that shown in FIG. 12A. The indicator MB is an indicator that is formed of a plurality (preferably an odd number) of sections that can be lit up according to the score. This indicator MB indicates the score by lighting up one of the sections. The evaluation indicating portion 31f defines (i.e., determines) the section corresponding to the score and then lights up that defined section, as shown in FIG. 12B.

Here, in the third example embodiment, the control unit executes active and effective assist control with respect to the operational input by the driver. In addition, the control unit actively provides the driver with information provided in or known by the control unit via the indicator, so compatibility between vehicle control and operations by the driver can be improved by the mutual interaction of these. As a result, performance with even greater fuel efficiency can be realized.

Figure 13:
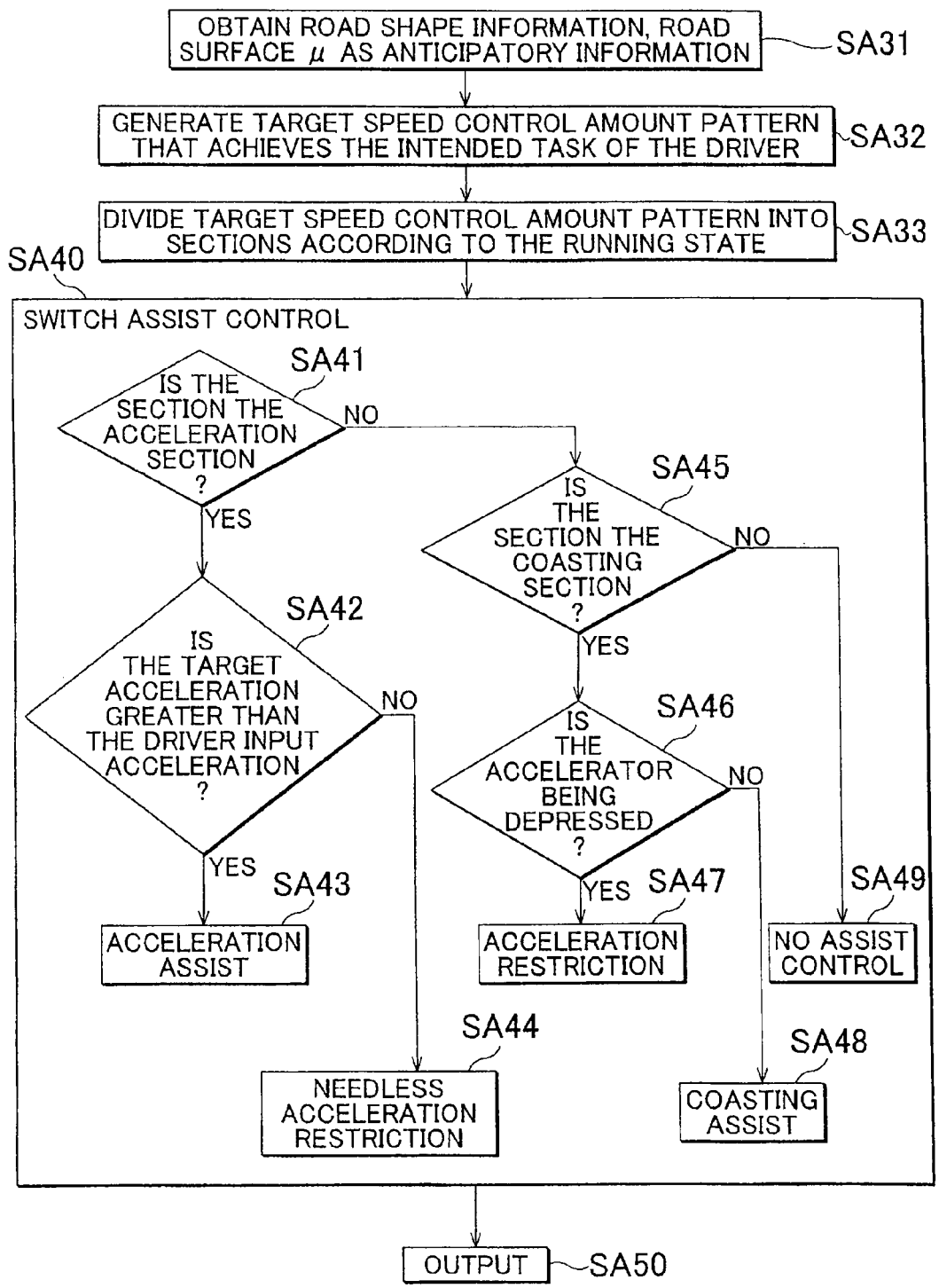
FIG. 13 is a flowchart illustrating an example of a main operation.

Continuing on, an example of a main operation and the like performed by the ECU 31 having the structure described above will be described with reference to FIG. 13 and the like. FIG. 13 is a flowchart illustrating an example of a main operation of the third example embodiment.

First, the ECU 31 obtains the road shape information and the road surface μ as anticipatory information (step SA31).

Next, the generating portion 31a generates a target speed/acceleration pattern that will achieve the intended task of the driver, including target arrival time and optimum fuel efficiency (step SA32).

One example of a target speed pattern calculation is as described above. Next, another example of a target speed pattern calculation will be described. A target speed pattern is calculated by correcting the speed state from the position where running control starts toward the position where running control ends, and correcting the speed state from the point where running control ends to the position where running control starts, of a normally generated speed pattern (steady circular highest speed pattern). More specifically, a speed pattern is generated along a target travel route, and the running of the vehicle is controlled based on this speed pattern. Two speed state correcting means are provided, i.e., first speed state correcting means for executing a speed state correction process from the start position of running control along the target travel route toward the end position of that running control, and second speed state correcting means for executing a speed state correction process from the end position of the running control along the target travel route toward the start position of running control. Accordingly, a speed pattern corresponding to the travel route is generated in a short period of time by executing the speed state correction process from the start position toward the end position of running control along the target travel route, and executing the speed state correction process from the end position toward the start position of the running control along the target travel route, without using the optimization method.

Also, the acceleration side speed state is corrected, and the deceleration side speed state is corrected. In this case, the speed state is corrected to the lower speed side.

Also, travel route dividing means for dividing the target travel route into regular intervals is provided. The speed state is corrected for each region of the divided target travel route. The speed states of adjacent regions are then compared, and the speed state of the region with the higher speed is corrected to the lower speed side. In this case, the acceleration or deceleration in adjacent regions are compared and corrected to inhibit excessive acceleration or excessive deceleration. Therefore, the target travel route is divided into regular intervals and the speed state is corrected to the low speed side for each region.

Incidentally, the deceleration at adjacent points may also be calculated from the running end point toward the running start point after calculating the acceleration at adjacent points from the running start point toward the running end point, for the steady circular highest speed pattern along the target travel route. Also, the acceleration at adjacent points may also be calculated from the running start point toward the running end point after calculating the deceleration at adjacent points from the running end point toward the running start point, for the steady circular highest speed pattern along the target travel route.

Returning now to the description of FIG. 13, the defining portion 31b divides the target speed/acceleration pattern generated in step SA32 into two sections, i.e., an acceleration section and a coasting section, according to the running state of the target speed/acceleration pattern (step SA33).

Next, the assist control portion 31d executes assist control corresponding to the section defined in step SA33, while monitoring the actual running of the vehicle (step SA40).

More specifically, when the actual running position of the vehicle is in the acceleration section defined in step SA33 (i.e., Yes in step SA41), and the driver input acceleration estimated from the vehicle speed, the current brake pedal input amount, and the current accelerator input amount is less than a target acceleration (i.e., Yes in step SA42), the assist control portion 31d executes the acceleration-assist assist control described above (step SA43). On the other hand, when that input acceleration is not less than the target acceleration (i.e., No in step SA42), the assist control portion 31d executes the needless acceleration-restriction assist control (step SA44). More specifically, in step S43, the acceleration-assist assist control consists of increasing the gain in an accelerator operation amount–required acceleration map, and in step SA44, the needless acceleration restriction assist control consists of reducing the gain in the accelerator operation amount–required acceleration map.

Also, when the actual running state of the vehicle is not in the acceleration section defined in step SA33 (i.e., No in step SA41) and but is in the coasting section (i.e., Yes in step SA45), the assist control portion 31d executes the acceleration restriction assist control described above (step SA47) if the driver is depressing the accelerator (i.e., Yes in step SA46), and executes the coasting-assist assist control (step SA48) if the driver is not depressing the accelerator (i.e., No in step S46). More specifically, in step SA47, the acceleration restriction assist control consists of significantly reducing the gain in the accelerator operation amount–required acceleration map. Incidentally, the suppression gain of the acceleration restriction executed in step SA47 may also be set larger than the suppression gain of the needless acceleration restriction executed in step SA44. Also, in step SA48, coasting-assist assist control consists of setting the torque output by the vehicle to zero in a hybrid (HV) vehicle, and running in a range equivalent to the neutral (N) range in a manual transmission (MT) vehicle.

Also, when the actual running position of the vehicle is not is a coasting section (i.e., No in step SA45), the assist control portion 31d does not execute assist control (step SA49). For example, if the map gain has been changed, the assist control portion 31d returns the gain to its original state.

Returning to the description of the main operation in FIG. 13, the ECU 31 controls the output of the actuators (step SA50) to execute the assist control switched in step SA40. More specifically, the ECU 31 controls the output of the throttle actuator 36 and the like such that the vehicle runs according to the accelerator operation amount–required acceleration map in which the gain had been changed by executing the assist control in step SA40. This concludes the description of the main operation of the third example embodiment.

Figure 14:
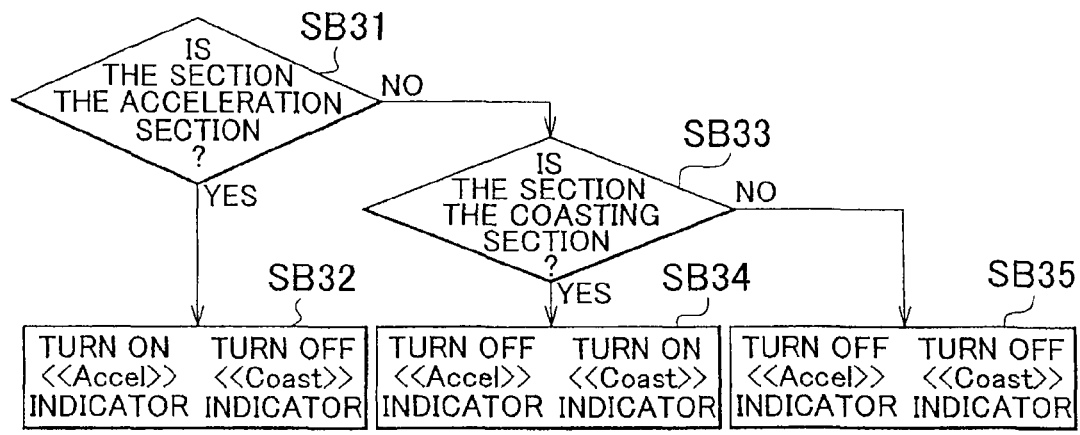
FIG. 14 is a flowchart illustrating an example of a section indicating operation.

Next, an example of a section indicating operation performed by the ECU 31 described above will be described with reference to FIG. 14, which is a flowchart illustrating an example of the section indicating operation of the third example embodiment.

First, when the actual running state of the vehicle is in the acceleration section (i.e., Yes in step SB31), the section indicating portion 31d lights up the indicator MA1 and turns off the indicator MA2 (step SB32).

Also, when the actual running state of the vehicle is not in the acceleration section (i.e., No in step SB31) but is in the coasting section (i.e., Yes in step SB33), the section indicating portion 31d turns off the indicator MA1 and lights up the indicator MA2 (step SB44). When the actual running state of the vehicle is not in the acceleration section (i.e., No in step SB31) nor in the coasting section (i.e., No in step SB33), the section indicating portion 31d turns off both the indicator MA1 and the indicator MA2 (step SB35). This concludes the description of the section indication operating of the third example embodiment.

Figure 15:
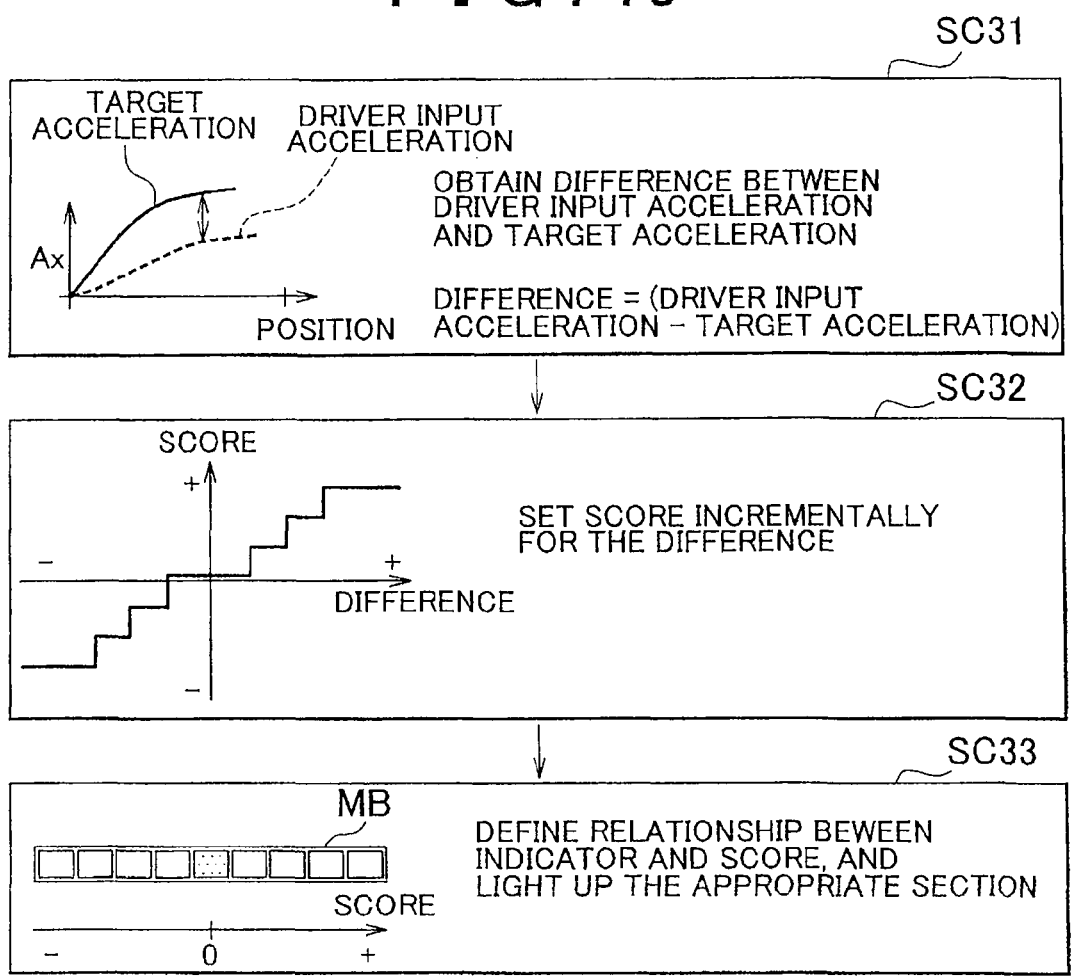
FIG. 15 is a flowchart illustrating an example of a score indicating operation.

Next, an example of a score indicating operation performed by the ECU 31 structured ad described above will be described with reference to FIG. 15, which is a flowchart illustrating an example of the score indicating operation of the third example embodiment.

First, the setting portion 31e obtains the difference between the driver input acceleration estimated from the current accelerator pedal input amount, brake pedal input amount, and vehicle speed, and the target acceleration (i.e., input acceleration–target acceleration) as the difference (step SC31).

Next, the setting portion 31e incrementally sets a score for the difference obtained in step SC31 based on a preset difference–score map (step SC32).

Then the evaluation indicating portion 31f defines (i.e., determines) the section corresponding to the score set in step SC32 from among a plurality of steps that make up the indicator MB, and lights up the defined section (step SC33). More specifically, the evaluation indicating portion 31f indicates to the driver that the accelerator operation is excessive (excessive acceleration) in the manner shown in FIG. 12B, by having the score correspond to a section that is farther to the right as the score increases. Also, the evaluation indicating portion 31f indicates to the driver that the accelerator operation is insufficient (insufficient acceleration) in the manner shown in FIG. 12B, by having the score correspond to a section that is farther to the left as the score decreases. Further, the evaluation indicating portion 31f indicates to the driver that the accelerator operation is just right in the manner shown in FIG. 12B, by having the score correspond to a section toward the center if the score is in the middle. This concludes the description of the score indicating operation of the third example embodiment.

As described above, with this third example embodiment, a target speed pattern is generated using the shape of the course and other information, divides the generated target speed pattern into a plurality of speed patterns, and executes assist control with respect to a driver operation according to those sections. As a result, optimum assist control that corresponds to the target speed pattern is executed with respect to a demand by the driver, and the travel plan and a driver operation are effectively coordinated so and the actual running results of the vehicle are able to be closer to that travel plan.

Also, according to the third example embodiment, information related to the sections, i.e., the acceleration section and the coasting section, information related to operational demands on the driver, such as depressing the accelerator (Accel ON) or releasing the accelerator (Accel Off), and information related to the difference between the target pattern and the driver input is indicated on the indicator. As a result, even when the vehicle is actively assist-controlled, feelings of unpleasantness or abruptness that the driver may have with respect to the assist control can be suppressed. Also, in the third example embodiment, the control unit has the target speed/acceleration pattern and knows what running state (running pattern) the vehicle should be in a given position, so by having the control unit perform active assist control and actively provide that information to the driver, compatibility between vehicle control and operations by the driver can be improved by the mutual interaction of these. As a result, performance with even greater fuel efficiency can be realized.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A running pattern calculating apparatus that calculates a running pattern in a path along which a vehicle will travel, comprising:
    a road information storage portion that stores road information;
    a running state predicting portion that predicts a running state when the vehicle will travel on a road, based on the road information stored in the road information storage portion;
    an evaluation function setting portion that divides the road into a plurality of sections based on the running state predicted by the running state predicting portion, and sets an evaluation function for each road section; and
    a running pattern calculating portion that calculates a running pattern of the vehicle that will travel on the road, based on the evaluation function set for each road section by the evaluation function setting portion,
    wherein the running state predicting portion calculates a speed pattern predicted when the vehicle will travel on the road, based on the road information stored in the road information storage portion, and the evaluation function setting portion divides the road into at least an acceleration section and a deceleration section as the road sections, based on the speed pattern calculated by the running state predicting portion, and sets an acceleration section evaluation function for the acceleration section, and a deceleration section evaluation function for the deceleration section.

2. The running pattern calculating apparatus according to claim 1, wherein the running pattern calculating portion calculates the running pattern with the position of the division between the sections of the road divided by the evaluation function setting portion as a variable condition.

3. The running pattern calculating apparatus according to claim 1, wherein the evaluation function setting portion sets the evaluation function that evaluates an engine speed of equal to or higher than medium speed as more preferable than an engine speed near zero, as the acceleration section evaluation function.

4. The running pattern calculating apparatus according to claim 1, wherein the evaluation function setting portion obtains a rate of thermal efficiency of an engine at each point when the best point for the thermal efficiency is given a numerical value of 1, sets the evaluation function in which the difference between each of all of the obtained thermal efficiency rates and 1 becomes an evaluation value as the acceleration section evaluation function, and makes the evaluation value when the engine speed is near zero a numerical value greater than 0.

5. The running pattern calculating apparatus according to claim 1, wherein the evaluation function setting portion sets the evaluation function that evaluates an engine speed near zero as more preferable than an engine speed equal to or higher than medium speed as the deceleration section evaluation function.

6. The running pattern calculating apparatus according to claim 1, wherein the evaluation function setting portion sets the evaluation function in which a numerical value at which the loss of energy input/output in a hybrid system is proportionate to acceleration/deceleration energy removed from rolling resistance deceleration is the evaluation value, when the rolling resistance is 0 as a reference, as the deceleration section evaluation function, and makes the evaluation value when the engine speed is equal to or higher than medium engine speed a numerical value greater than 0.

7. The running pattern calculating apparatus according to claim 1, further comprising:
    an assist control unit that defines a plurality of sections corresponding to the running state based on a target speed/acceleration pattern related to a target speed or a target acceleration when the vehicle is traveling, and assists to achieve a travel plan for each defined section.

8. The running pattern calculating apparatus according to claim 7, wherein the assist control unit outputs, in a visually and/or audibly recognizable manner, information related to the running state corresponding to the section and/or information related to a difference between the speed or the acceleration of the target speed/acceleration pattern and the speed or the acceleration input to the vehicle by the driver.

9. A running pattern calculating apparatus that calculates a running pattern in a path along which a vehicle will travel, comprising:
    a road information storage portion that stores road information;
    a running state predicting portion that predicts a running state when the vehicle will travel on a road, based on the road information stored in the road information storage portion;
    an evaluation function setting portion that divides the road into a plurality of sections based on the running state predicted by the running state predicting portion, and sets an evaluation function for each road section; and a running pattern calculating portion that calculates a running pattern of the vehicle that will travel on the road, based on the evaluation function set for each road section by the evaluation function setting portion, wherein the running state predicting portion calculates a friction circle use rate predicted when the vehicle will travel on the road, based on the road information stored in the road information storage portion, and the evaluation function setting portion sets the evaluation function for the road section in which the friction circle use rate calculated by the running state predicting portion is relatively high different from the evaluation function for the road section in which the friction circle use rate is relatively low.

10. The running pattern calculating apparatus according to claim 9, wherein when the friction circle use rate calculated by the running state predicting portion is relatively high, the evaluation function setting portion sets the evaluation function that evaluates acceleration emphasizing thermal efficiency based on the engine operating state together with a hybrid system as preferable for the road section in which the running state is an accelerating state, and sets the evaluation function that evaluates deceleration by regeneration and power assist based on the engine being off as preferable for the road section in which the running state is a decelerating state.

11. A running pattern calculating method for calculating a running pattern in a path along which a vehicle will travel, comprising:

storing road information;

predicting a running state when the vehicle will travel on a road, based on the stored road information;

dividing the road into a plurality of sections based on the predicted running state, and setting an evaluation function for each road section;

calculating a running pattern of the vehicle that will travel on the road, based on the evaluation function set for each road section;

calculating a speed pattern predicted when the vehicle will travel on the road, based on the stored road information;

dividing the road into at least an acceleration section and a deceleration section as the road sections, based on the calculated speed pattern; and setting an acceleration section evaluation function for the acceleration section, and a deceleration section evaluation function for the deceleration section.

12. A running pattern calculating method for calculating a running pattern in a path along which a vehicle will travel, comprising:

storing road information;

predicting a running state when the vehicle will travel on a road, based on the stored road information;

dividing the road into a plurality of sections based on the predicted running state, and setting an evaluation function for each road section;

calculating a running pattern of the vehicle that will travel on the road, based on the evaluation function set for each road section;

calculating a friction circle use rate predicted when the vehicle will travel on the road, based on the stored road information; and setting the evaluation function for the road section in which the calculated friction circle use rate is relatively high different from the evaluation function for the road section in which the calculated friction circle use rate is relatively low.

* * * * *